(12) United States Patent
Sonka et al.

(10) Patent No.: US 8,571,278 B2
(45) Date of Patent: Oct. 29, 2013

(54) SYSTEM AND METHODS FOR MULTI-OBJECT MULTI-SURFACE SEGMENTATION

(75) Inventors: Milan Sonka, Coralville, IA (US); Xiaodong Wu, Iowa City, IA (US); Yin Yin, Iowa City, IA (US); Xiangmin Zhang, Morgan Hill, CA (US)

(73) Assignee: The University of Iowa Research Foundation, Iowa City, IA (US)

( * ) Notice: Subject to any disclaimer, the term of this patent is extended or adjusted under 35 U.S.C. 154(b) by 1355 days.

(21) Appl. No.: 12/291,803

(22) Filed: Nov. 13, 2008

(65) Prior Publication Data

US 2009/0136103 A1    May 28, 2009

Related U.S. Application Data

(63) Continuation-in-part of application No. 11/474,070, filed on Jun. 23, 2006, now Pat. No. 7,995,810.

(60) Provisional application No. 60/694,075, filed on Jun. 24, 2005.

(51) Int. Cl.
*G06K 9/00* (2006.01)

(52) U.S. Cl.
USPC .................................................. 382/128

(58) Field of Classification Search
None
See application file for complete search history.

(56) References Cited

U.S. PATENT DOCUMENTS

| | | | | |
|---|---|---|---|---|
| 6,148,095 | A | 11/2000 | Prause et al. | |
| 6,466,687 | B1 | 10/2002 | Uppaluri et al. | |
| 7,421,122 | B2 * | 9/2008 | Kaus et al. | 382/173 |
| 7,526,131 | B2 * | 4/2009 | Weber | 382/199 |
| 2002/0009222 | A1 * | 1/2002 | McGibbon et al. | 382/154 |
| 2007/0058865 | A1 * | 3/2007 | Li et al. | 382/173 |
| 2008/0069445 | A1 * | 3/2008 | Weber | 382/181 |
| 2008/0317308 | A1 * | 12/2008 | Wu et al. | 382/128 |
| 2009/0136103 | A1 * | 5/2009 | Sonka et al. | 382/128 |
| 2009/0274350 | A1 * | 11/2009 | Pavlovskaia et al. | 382/128 |
| 2010/0119109 | A1 * | 5/2010 | Kim et al. | 382/103 |

OTHER PUBLICATIONS

X. Wu and D. Z. Chen. Optimal net surface problem with applications. In *Proc. of the 29th International Colloquium on Automata, Languages and Programming (ICALP)*, vol. 2380, pp. 1029-1042. Springer Verlag, Jul. 2002.

M. Sonka, Efficient Optimal Surface Detection: Theory Implementation and Experimental Validation, 2004, SPIE Medical Imaging 2004: Image Processing. Edited by Fitzpatrick, J. Michael; Sonka, Milan. Proceedings of the SPIE, vol. 5370, pp. 620-627.

(Continued)

*Primary Examiner* — Bhavesh Mehta
*Assistant Examiner* — Tahmina Ansari
(74) *Attorney, Agent, or Firm* — Valauskas Corder LLC

(57) ABSTRACT

A system and methods for the efficient segmentation of globally optimal surfaces representing object boundaries in volumetric datasets is provided. An optical surface detection system and methods are provided that are capable of simultaneously detecting multiple interacting surfaces in which the optimality is controlled by the cost functions designed for individual surfaces and by several geometric constraints defining the surface smoothness and interrelations. The present invention includes surface segmentation using a layered graph-theoretic approach that optimally segments multiple interacting surfaces of a single object using a pre-segmentation step, after which the segmentation of all desired surfaces of the object are performed simultaneously in a single optimization process.

25 Claims, 20 Drawing Sheets
(6 of 20 Drawing Sheet(s) Filed in Color)

(56) References Cited

OTHER PUBLICATIONS

K. Li, X. Wu, D. Chen, M. Sonka; Globally Optimal Segmentation of Interacting Surfaces with Geometric Constraints, 2004, Computer Vision and Pattern Recognition, CVPR 2004., Proceedings of the 2004 IEEE Computer Society Conference on vol. 1, pp. 394-399.

M. Sonka, Efficient Optimal Surface Detection: Theory Implementation and Experimental Validation, 2004, SPIE International Symposium on Medical Imaging 2004: Image Processing, Powerpoint Presentation.

K. Li, S. Millington, X. Wu, D. Z. Chen, and M. Sonka. Simultaneous segmentation of multiple closed surfaces using optimal graph searching, 2005, Inf. Process Med Imaging, vol. 19, pp. 406-417.

X. Wu, D. Chen, K. Li, M. Sonka, The Layered Net Surface Problems in Discrete Geometry and Medical Image Segmentation, 2005, Algorithms and Computation, vol. 3827, pp. 17-27, Springer Berlin/Heidelberg.

K. Li, X. Wu, D. Z. Chen, and M. Sonka. Optimal surface segmentation in volumetric images—a graph-theoretic approach. *IEEE Trans. Pattern Anal. and Machine Intelligence*, Jan. 2006, vol. 28, iss. 1, pp. 119-134.

X. Wu; Efficient Algorithms for the Optimal-Ratio Region Detection Problems in Discrete Geometry with Applications; Algorithms and Computation, 2006, vol. 4288, pp. 289-299; Springer Berlin / Heidelberg.

X. Wu, D. Chen, K. Li, M Sonka, The Layered Net Surface Problems in Discrete Geometry and Medical Image Segmentation, 2007, Int'l J. Computational Geometry and Applications, vol. 17, iss. 3, pp. 261-296.

M. Haeker, M. Sonka, R. Kardon, V. Shah, X. Wu, and M. Abramoff, Automated Segmentation of Intraretinal Layers from Macular Optical Coherence Tomography Images; Medical Imaging 2007: Image Processing, 2007, vol. 6512, pp. 651214.

M. Haeker, M. D. Abramoff, X. Wu, R. Kardon, and M. Sonka. Use of varying constraints in optimal 3-d graph search for segmentation of macular optical coherence tomography images. Med. Image Computing and Computer Assisted Interv. (MICCAI), Mar. 2007, vol. 10, part 1, pp. 244-251.

M. Haeker, Automated 3-D Segmentation and Analysis of Retinal Optical Coherence Tomography Images, Thesis—Comprehensive Exam and Project Proposal, University of Iowa, May 11, 2007.

M. Haeker, X. Wu, M. Abramoff, R. Kardon, and M. Sonka, Incorporation of Regional Information in Optimal 3-D Graph Search with Application for Intraretinal Layer Segmentation of Optical Coherence Tomography Images, Inf. Process Med. Imaging, 2007, vol. 20, pp. 607-618.

\* cited by examiner

| Image Size | k=2 | k=3 | Image Size | k=2 | k=3 |
|---|---|---|---|---|---|
| $40^2 \times 40$ | 1.2 | 1.7 | $100^2 \times 40$ | 16.2 | 22.3 |
| $60^2 \times 40$ | 3.3 | 4.8 | $140^2 \times 40$ | 85.8 | 96.1 |
| $80^2 \times 40$ | 6.1 | 9.4 | $200^2 \times 40$ | 376.1 | 401.3 |

*FIG. 7C*

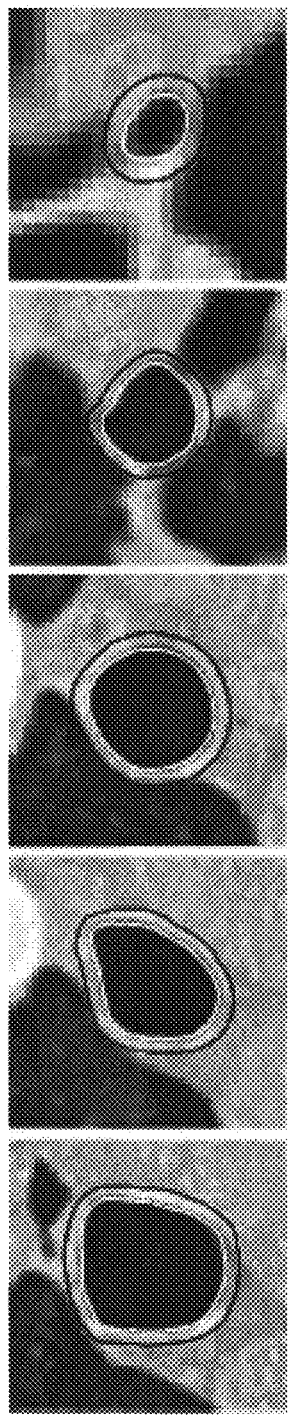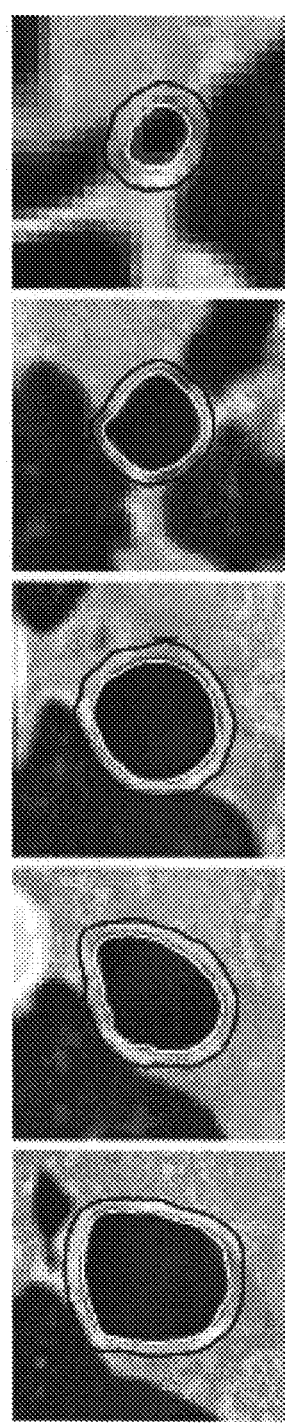
FIG. 9A
FIG. 9B

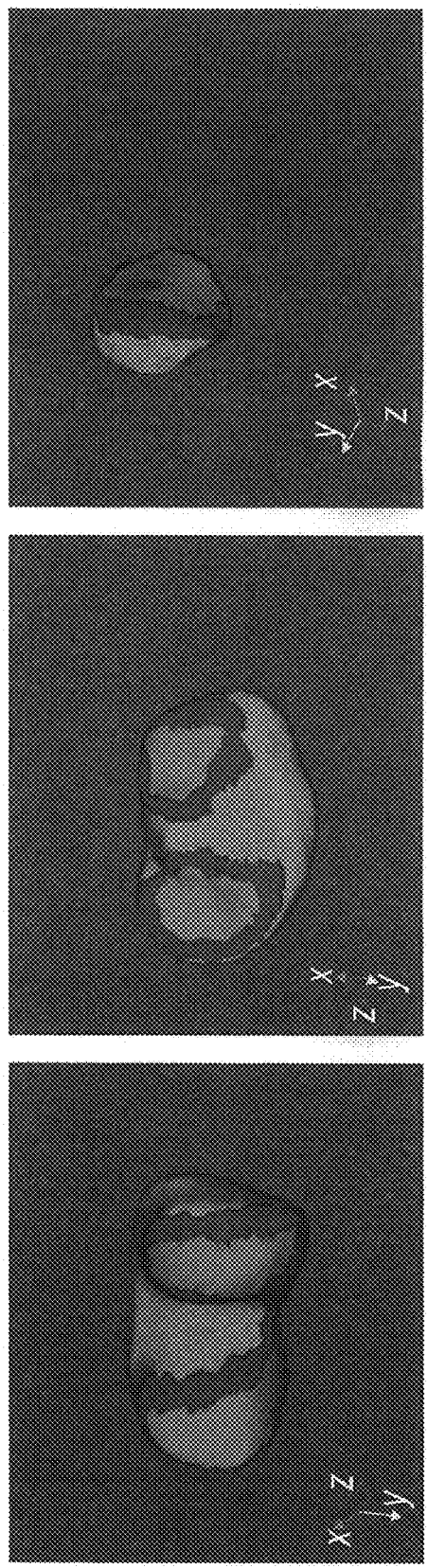

SYSTEM AND METHODS FOR MULTI-OBJECT MULTI-SURFACE SEGMENTATION

This application is a continuation-in-part of U.S. application Ser. No. 11/474,070, filed Jun. 23, 2006 now U.S. Pat. No. 7,995,810, which claims the benefit of U.S. Provisional Application No. 60/694,075, filed Jun. 24, 2005, incorporated herein by reference in its entirety.

STATEMENT CONCERNING FEDERALLY SPONSORED RESEARCH

The development of this invention was in part supported by government contracts from the National Institutes of Health grants R01-EB004640 and R44-AR052983. The government has certain rights in the invention.

BACKGROUND OF THE INVENTION

The present invention is discussed in the following largely with reference to the medical industry, but the present invention is applicable to a variety of contexts and environments, including those that may utilize multidimensional data, for example, radar, sonar, lidar, X-ray, ultrasound, optical imaging, seismology data, ionospheric tomography, and many others.

Diagnostic imaging has influenced many aspects of modern medicine. The availability of volumetric images from X-ray computed tomography (CT), magnetic resonance (MR), 3-D ultrasound, positron emission tomography (PET) and many other imaging modalities has permitted a new level of understanding of biology, physiology, anatomy to be reached, as well as facilitated studies of complex disease processes. While the ability to acquire new and more sophisticated medical images has developed very rapidly in the past 20 years, the ability to analyze medical imagery is still performed visually and in a qualitative manner. A practicing physician, such as a radiologist seeking to quantitatively analyze volumetric information—for example, to determine a tumor size, quantify its volumetric change from the previous imaging session, measure plaque volume, objectively assess airway reactivity to allergens throughout the lungs, etc.— would largely be able only to manually outline regions of interest in a number of two-dimensional images. Some single-purpose tools have been developed for the quantitative analysis of medical images, their usefulness is limited. The use of these tools is often tedious and time consuming and requires an excessive amount of user interaction. They frequently fail in the presence of disease. Therefore, they are typically unsuitable for routine employment in the clinical care setting. Since volumetric and/or dynamic medical images frequently cannot be reliably analyzed quantitatively using today's tools, a significant and possibly critical portion of the image information cannot be used for clinical diagnostic purposes.

3-D Medical Image Segmentation

It is a standard practice to analyze 3-D medical images as sequences of 2-D image slices forming the 3-D data. There are many essential problems associated with this approach. The most fundamental ones stem from the lack of contextual slice-to-slice information when analyzing sequences of adjacent 2-D images. Performing the segmentation directly in the 3-D space tends to bring more consistent segmentation results, yielding object surfaces instead of sets of individual contours. 3-D image segmentation techniques—for example, techniques known by the terms region growing, level sets, fuzzy connectivity, snakes, balloons, active shape and active appearance models—are known. None of them, however, offers a segmentation solution that achieves optimal results. The desire for optimal segmentation of an organ or a region of pathology, for example, is critical in medical image segmentation.

Reliable tools for automated image segmentation are a necessary prerequisite to quantitative medical image analyses. Medical image segmentation is frequently divided into two stages—localization of the object of interest (to distinguish the object from other objects in the image), and accurate delineation of the object's borders or surfaces. Almost universally known, segmentation methods that perform well on the task of robust object localization usually do not perform well with respect to the accurate border/surface delineation, and vice versa.

One embodiment of the present invention is directed to new optimal image segmentation methods that allow the identification of single surfaces as well as simultaneously allowing the identification of multiple interacting surfaces in 3-D and 4-D medical image datasets. Embodiments in accordance with the present invention using the graph-based approaches to segmentation provide the ability to determine the object boundaries in an optimal fashion, i.e., optimal with respect to a task-specific objective function. Consequently, robust object localization techniques may be used to identify the object of interest in the image data followed by graph construction and optimal graph-search segmentation. The proposed n-D graph search segmentation methods are preferable for the stage-2 task of such a two-stage process.

Segmentation Optimality in 3-D and 4-D

While many of the image segmentation methods may be able to provide a locally optimal solution, they may not be able to provide a globally optimal solution. Such methods either cannot address the globally optimal criterion at all, or compute only an approximate solution that could be arbitrarily far away from the global optimum.

Furthermore, most of the known 3-D segmentation techniques used today are region based—examples include region growing, fuzzy connectivity, and watershed techniques, as would be understood by those with skill in the art. These techniques are frequently iterative and their operation is based on a sequence of locally optimal steps, with no guarantee of achieving global optimality once they converge to a solution. Results of region-based methods are frequently locally incorrect, and the performance of these methods often suffers from the problem of "leaking" into surrounding regions.

The second family of 3-D image segmentation techniques consists of edge-based (boundary-based) methods. Examples include active shape models, snakes and their 3-D extensions, and level sets. All these methods converge to some local optimum and globally optimal solution cannot be guaranteed. As a result, the use of known segmentation methods largely cannot be consistently automated in that they require substantial human supervision and interaction.

While combinations of edge-based and region-based approaches Active Appearance Models ("AMM") are known and are quite powerful, as with other approaches, the optimization process frequently ends in a local optimum. Additionally, the AAM approach requires that point correspondence be established among the individual instances of the object samples used for training.

Objective Functions

In many segmentation methods, the segmentation behavior is controlled by the objective function that is employed. It is the goal of the segmentation process typically to optimize— that is minimize—the objective function. The objective functions are almost always task specific. Incorporating a priori knowledge reflecting the segmentation goal is a norm. In many cases, the objective function is specified by the human designer. Methods for automated design of objective functions are beginning to appear. In the latter case, the form of the objective function is decided upfront and the objective function parameters are set via machine learning processes. While an infinite number of task specific objective functions can be designed, there is a small number of objective (cost) function forms that are considered sufficiently general so that task-specific cost functions can be derived from them by parameter setup.

An objective function that follows what is known as the Gibbs model mainly reflects the object edge properties. It is frequently used in deformable models and graph searching methods. The terms reflect image data properties like gray level, local texture, edge information, etc., (sometimes called external energy) as well as the resulting border/surface shape or smoothness requirements and hard constraints (internal energy, constraints). A region-based objective function has been proposed by Chan and Vese that is based on region statistics and can yield segmentation in cases when no edges are present on object boundaries. Their objective function is a piecewise constant generalization of the Mumford-Shah functional. A different approach was proposed by Yezzi et al. Their binary model is designed to segment images consisting of two distinct but constant intensity regions and thus attempts to maximize the distance between the average gray levels of the objects and the background. A binary variance model was proposed based on image variances. The extension of these objective functions to 3-D was presented.

Previous Graph-Based Approaches to Image Segmentation

Graph-based approaches have been playing an important role in image segmentation in the past years. The common theme of these approaches is the formation of a weighted graph in which each vertex is associated with an image pixel and each graph edge has a weight relative to the corresponding pixels of that edge to belong to the same object. The resulting graph is partitioned into components in a way that optimizes some specified criteria of the segmentation.

First, a Minimum Spanning Tree ("MST") of the associated graph is used. Recently, Felzenszwalb and Huttenlocher developed an MST-based technique that adaptively adjusts the segmentation criterion based on the degree of variability in the neighboring regions of the image. Their method attains certain global properties, while making local decisions using the minimum weight edge between two regions in order to measure the difference between them. This approach may be made more robust in order to deal with outliers by using a quantile rather than the minimum edge weight. This solution, however, makes the segmentation problem Non-deterministic Polynomial-time hard (NP-hard).

Many 2-D medical image segmentation methods are based on graph searching or use dynamic programming to determine an optimal path through a 2-D graph. Attempts extending these methods to 3-D and making 3-D graph searching practical in medical imaging are known. An approach using standard graph searching principles has been applied to a transformed graph in which standard graph searching for a path was used to define a surface. While the method provided surface optimality, it was at the cost of enormous computational requirements. A heuristic sub-optimal approach to surface detection that was computationally feasible was also developed.

A third class of graph-based segmentation methods is known. It employs minimum graph cut techniques, in which the cut criterion is designed to minimize the similarity between pixels that are to be partitioned. Wu and Leahy were the first to introduce such a cut criterion, but the approach was biased towards finding small components. The bias was addressed later by ratio regions, minimum ratio cycles, and ratio cuts. However, all these techniques are applicable only to 2-D settings. Shi and Malik developed a novel normalized cut criterion for image segmentation, which takes into account the self-similarity of the regions and captures non-local properties of the image. Recently, Weiss showed that Shi and Malik's eigen vector-based approximation is related to the more standard spectral partitioning methods on graphs. However, all such approaches are computationally too expensive for many practical applications. Ishikawa and Geiger formulated an image segmentation problem as a class of Markov Random Field ("MRF") models. Yet, this method applies only if the pixel labels are one-dimensional and their energies are not discontinuity preserving.

An energy minimization framework using minimum s-t cuts was established by Boykov et al. and Kolmogorov et al. They considered non-convex smooth priors and developed efficient heuristic algorithms for minimizing the energy functions. Several medical image segmentation techniques based on this framework were developed by Boykov et al. and Kim et al. The cost function employed in their work follows the "Gibbs model" given in: $\epsilon(f)=\epsilon_{data}(f)+\epsilon_{smooth}(f)$. For certain forms of smooth priors, Kolmogorov et al. applied minimum s-t cuts to minimize $\epsilon(f)$.

Recently, Boykov developed an interactive segmentation algorithm for n-D images based on minimum s-t cuts, which is further improved. The cost function used is general enough to include both the region and boundary properties of the objects. While the approach by Boykov is flexible and shares some similarities with the level set methods, it needs the selection of object and background seed points that is difficult to achieve for many applications. Additionally, without taking advantage of the prior shape knowledge of the objects to be segmented, the results are topology-unconstrained and may be sensitive to initial seed point selections.

Segmentation of Mutually Interacting Surfaces

In medical imaging, many surfaces that need to be identified appear in mutual interactions. These surfaces are "coupled" in a way that their topology and relative positions are usually known already (at least in a general sense), and the distances between them are within some specific range. Incorporating these surface-interrelations into the segmentation can further improve accuracy and robustness, especially when insufficient image-derived information is available for defining some object boundaries or surfaces. Such insufficiency can be remedied by using clues from other related boundaries or surfaces. Simultaneous optimal detection of multiple coupled surfaces thus yields superior results compared to the traditional single-surface detection approaches. Simultaneous segmentation of coupled surfaces in volumetric medical images is an under explored topic, especially when more than two surfaces are involved.

Several methods for detecting coupled surfaces have been proposed in recent years. None of them, however, guarantees a globally optimal solution. The Active Shape Model ("ASM") and Active Appearance Models ("AMM") implicitly take into account the geometric relations between surfaces due to the statistical shape constraints. The frequently used iterative gradient descent methods may end at a local optimum. The method is essentially 2-D and needs a precise manual initialization. Other methods are based on coupled parametric deformable models with self-intersection avoidance, which requires a complex objective function and is computationally expensive. Still other methods utilize level-set formulations that can take advantage of efficient time-implicit numerical schemes. They are, unfortunately, not topology-preserving. Further, the local boundary-based formulation can be trapped in a local minimum that is arbitrarily far away from the global optimum. While the introduction of a weighted balloon-force term may alleviate this difficulty, it exposes the model to a "leaking" problem. Finally, the feasibility of extending these methods to handling more than two surfaces is unverified.

SUMMARY OF THE INVENTION

A method for surface detection of a structure using a cost functional is provided. The method comprises the steps of building a graph having multiple spatial positions, followed by transforming the graph. Then, a non-empty minimum-cost closed set for the graph is determined and an upper envelope of the non-empty minimum-cost closed set is resolved. The upper envelope can then be utilized to detect the surface of a structure.

In yet another embodiment of the present invention, building a graph step includes assigning a node to each of the spatial positions within the graph in x, y and z directions, wherein the assigning a node to each of the spatial positions creates columns of nodes.

In yet another embodiment of the present invention, building a graph step includes assigning a cost value to each of the nodes utilizing a piecewise-constant cost functional and to determine a cost path value from a cost path between adjacent nodes of the each of the nodes within the graph.

In yet another embodiment of the present invention, assigning a cost value to the each of the nodes step includes optimizing a piecewise-constant Mumford-Shah cost functional.

In yet another embodiment of the present invention, assigning a cost value to the each of the nodes includes optimizing a piecewise-constant Chan-Vese cost functional.

In yet another embodiment of the present invention, the piecewise-constant cost functional for a structure having a structure surface is optimized by estimating a mean intensity in an interior and an exterior of the structure surface and computing a cost for each of the nodes.

In yet another embodiment of the present invention, estimating a mean intensity includes distinguishing the interior and the exterior of the structure surface.

In yet another embodiment of the present invention, the interior of the structure surface is characterized by each of the nodes being located on or below the structure surface.

In yet another embodiment of the present invention, the exterior of the structure surface is characterized by each of the nodes being located above the structure surface.

In yet another embodiment of the present invention, the estimating a mean intensity includes defining an interior cone having at least one feasible surface and an exterior cone having at least one feasible surface for each of the nodes.

In yet another embodiment of the present invention, the interior cone of each of the nodes is a subset of nodes in the interior of any of the feasible surfaces passing each of the nodes.

In yet another embodiment of the present invention, the exterior cone of each of the nodes is a subset of nodes in the exterior of any of the feasible surfaces passing each of the nodes.

In yet another embodiment of the present invention, the estimating a mean intensity includes computing a mean intensity of the interior cone of each of the nodes.

In yet another embodiment of the present invention, the estimating a mean intensity includes computing a mean intensity of the exterior cone of each of the nodes.

In yet another embodiment of the present invention, the computing the cost value of each of the nodes includes computing a sum of an inside variance and an outside variance of a column of each of the nodes.

In yet another embodiment of the present invention, the inside variances of the column of a first node is a total sum of the squared differences between an intensity of each of the nodes on or below the first of the each of the nodes on the column and the mean intensity of the interior cone of the first of the each of the nodes.

In yet another embodiment of the present invention, the outside variances of the column of a first node is the total sum of the squared differences between the intensity of each node above the first node on the column and the mean intensity of the interior cone of the first node.

In yet another embodiment of the present invention, the building a graph step includes constructing edges of the graph with reference to columns by connecting the each of the nodes to the each of the nodes that are positioned bottommost and neighboring to the each of the nodes in an adjacent one of the columns and building vertical edges along each of the columns pointing downwards.

In yet another embodiment of the present invention, the transforming the graph step includes subtracting a cost path valued of each of the nodes by the adjacent beneath node cost value in the same column.

In yet another embodiment of the present invention, the transforming the graph step includes not changing the bottom-most nodes cost value and wherein the sum of the bottom-most nodes equals a value for the bottom-most nodes sum.

In yet another embodiment of the present invention, the transforming the graph step includes, if the value of the bottom-most nodes value is greater than or equal to zero, selecting any one or more of the bottom-most nodes and subtracting the cost of the selected bottom-most node(s) by any value greater than the bottom-most nodes sum.

In yet another embodiment of the present invention, the non-empty minimum-cost closed set is a subset of the graph nodes wherein no edge from any of each of the nodes in the subset connects to a node outside the subset and wherein the total cost value of the nodes in the closed set is less than or equal to the cost value of all other closed sets within the graph.

In yet another embodiment of the present invention, determining a non-empty minimum-cost closed set includes adding a start node and a terminal node to the graph including a plurality of nodes and building an edge-weighted directed graph. Then, a minimum s-t cut algorithm is applied and the method also determines which of the each of the nodes within the plurality of nodes is reachable by the start node.

In yet another embodiment of the present invention, resolving an upper envelope of the non-empty minimum-cost closed set includes computing each of the nodes corresponding to the topmost nodes along the n-th dimension in the non-empty minimum-cost closed set to form each of the computed nodes.

In yet another embodiment of the present invention, the computed nodes form the optimal surfaces.

A method for simultaneous detection of multiple interacting surfaces of a target object having a skeleton and having at least one 2-D image slice is provided. The method comprises the steps of building a weighted directed graph for each surface of the target object in an n-D geometric graph, determining an optimal closed set and then resolving an upper envelope of the non-empty minimum-cost closed set.

In yet another embodiment of the present invention, the target object is tubular and is unfolded along its skeleton.

In yet another embodiment of the present invention, the tubular target object is unfolded by performing a polar re-sampling in each of the 2-D image slices to form a re-sampled 2-D geometric space and embedding the re-sampled 2-D geometric space into a 3-D grid.

In yet another embodiment of the present invention, the building a weighted directed graph step for each surface of the target object includes assigning each of the nodes within the n-D geometric graph to an individual voxel in an n-D input image.

In yet another embodiment of the present invention, the building a graph step includes assigning a cost value to each of the nodes and determining the cost value from the n-D input image.

In yet another embodiment of the present invention, the building a weighted directed graph step includes constructing edges of the graph by connecting each of the nodes to each of the nodes positioned bottommost and neighboring to the node in an adjacent column and building vertical edges along each column.

In yet another embodiment of the present invention, the building a weighted directed graph step includes transforming the weighted directed graph.

In yet another embodiment of the present invention, the transforming the weighted directed graph step includes subtracting a target nodes cost value by the cost of each of the adjacent beneath nodes cost value.

In yet another embodiment of the present invention, transforming a weighted directed graph step includes, if the sum of the bottom-most nodes cost value is greater than or equal to zero, selecting any one or more of the bottom-most nodes and subtracting the cost value of the selected bottom-most node by any value greater than the sum.

In yet another embodiment of the present invention, the determining an optimal closed set includes computing a minimum-cost closed set of the graph by transforming a node-weighted directed graph into an edge-weighted directed graph. This is preferably accomplished by adding a start node having multiple connecting edges to each node that has a negative cost value to the weighted directed graph and calculating a terminal node having multiple connecting edges to each node that has a non-negative cost to the weighted directed graph.

In yet another embodiment of the present invention, each connecting edge of the multiple connecting edges is assigned a capacity that is equal to an absolute value of each of the nodes cost values to which each connecting edge is connected.

In yet another embodiment of the present invention, the determining a minimum-cost closed set step includes computing a maximum flow from the start node to the terminal node.

In yet another embodiment of the present invention, the resolving an upper envelope of the minimum-cost closed set step includes computing the voxels corresponding to the topmost nodes along the n-th dimension in the minimum-cost closed set.

A method for simultaneous detection of multiple interacting surfaces of a target object having a skeleton and having at least one 2-D image slice is provided. The method comprises the steps of building a node-weighted directed graph containing a grid of voxels including a plurality of bottommost voxels and a plurality of topmost voxels, determining an optimal closed set and resolving an upper envelope of a non-empty minimum-cost closed set.

In yet another embodiment of the present invention, the target object is tubular and unfolded along the skeleton of the target object.

In yet another embodiment of the present invention, the target object is unfolded by performing a polar re-sampling in each of the 2-D image slices of the target object to form an n-D input image and embedding each re-sampled of the each 2-D image slices into a 3-D grid to form an n-D geometric graph of a n-D input image.

In yet another embodiment of the present invention, the building a node-weighted directed graph step is repeated for each of the multiple interacting surfaces of the target object and further includes a step of assigning a node within the n-D geometric graph to each of the voxels in the n-D input image.

In yet another embodiment of the present invention, the building a node-weighted directed graph step includes assigning a cost value to each of the nodes and determining the cost value from the n-D input image.

In yet another embodiment of the present invention, the building a node weighted directed graph step includes constructing edges between graph nodes to enforce geometric constraints to the sought (hyper)surfaces.

In yet another embodiment of the present invention, the geometric constraints include smoothness constraints and spatial separation constraints.

In yet another embodiment of the present invention, the smoothness constraints are constraining the smoothness of each sought (hyper)surface.

In yet another embodiment of the present invention, the spatial separation constraints confine the relative positioning and distance range between the sought (hyper)surfaces.

In yet another embodiment of the present invention, the edges that enforce smoothness constraints are constructed between nodes in adjacent columns, or between nodes within each column.

In yet another embodiment of the present invention, the edges that enforce spatial separation constraints are constructed between the nodes in different n-D subgraphs that correspond to the sought (hyper)surfaces.

In yet another embodiment of the present invention, the spatial separation constraints are specified using a minimum surface distance and a maximum surface distance.

In yet another embodiment of the present invention, the minimum surface distance is defined by two adjacent desired surfaces and the maximum surface distance is defined by two adjacent desired surfaces.

In yet another embodiment of the present invention, enforcing the spatial separation constraints is defined in that if the sub-graph $G_i$ (resp., $G_j$) is used to search for a surface $S_i$ (resp., $S_j$) and surface $S_j$ is above $S_i$, then $G_j$ is an upstream subgraph of $G_i$ and $G_i$ is a downstream subgraph of $G_j$.

In yet another embodiment of the present invention, enforcing the spatial separation constraints includes for each of the nodes in a subgraph, introducing a directed edge from each of the nodes to a second node on the corresponding column of the upstream subgraph, wherein the position distance between each of the nodes and the second node equals the minimum surface distance.

In yet another embodiment of the present invention, enforcing the spatial separation constraints includes for each of the nodes in a subgraph, introducing a directed edge from each of the nodes to a second node on the corresponding column of the downstream subgraph, wherein the position distance between each of the nodes and the second node equals the maximum surface distance.

In yet another embodiment of the present invention, the building a node-weighted directed graph step includes transforming the node weighted directed graph.

In yet another embodiment of the present invention, the transforming the node weighted directed graph step includes subtracting the cost value of each of the nodes by each of the adjacent beneath cost value in order to determine a cost value sum.

In yet another embodiment of the present invention, the transforming the node weighted directed graph step includes determining the cost value sum of the series of bottommost nodes which is equal to a bottom-most sum.

In yet another embodiment of the present invention, the transforming the node weighted directed graph step includes, if the bottom-most sum of the bottom-most nodes cost value is greater than or equal to zero, selecting any one or more of the bottom-most nodes and subtracting the cost of the selected bottom-most node by any value greater than the sum.

In yet another embodiment of the present invention, the determining an optimal closed set step includes assigning each of the nodes in the node-weighted directed graph a cost value associated with each of the nodes to provide a node cost value.

In yet another embodiment of the present invention, the determining of an optimal closed set includes computing a non-empty minimum-cost closed set of the graph by transforming a node-weighted directed graph into an edge-weighted directed graph includes the steps of adding a start node having multiple connecting edges to each node that has a negative node cost value to the graph and calculating a terminal node having multiple connecting edges to each node that has a non-negative node cost value to the graph.

In yet another embodiment of the present invention, each connecting edge of the multiple connecting edges is assigned a capacity that is equal to an absolute value of the cost value sum that each connecting edge is connected.

In yet another embodiment of the present invention, the determining a minimum-cost closed set step includes computing a maximum flow from the start node to the terminal node.

In yet another embodiment of the present invention, the resolving an upper envelope of the minimum-cost closed set step includes computing the voxels corresponding to the topmost nodes along the n-th dimension in the minimum-cost closed set.

In yet another embodiment of the present invention, the computed voxels form the sought optimal surfaces.

A method for simultaneous detection of multiple interacting surfaces of a tubular target object having a skeleton is provided. The method comprises the steps of unfolding the target object along the skeleton. building a node-weighted directed graph containing a grid of voxels including a series of bottommost voxels and a series of topmost voxels, determining an optimal closed set and resolving an upper envelope of a non-empty minimum-cost closed set.

A method for the simultaneous detection of multiple interacting surfaces of a target object in n-D images, wherein the target object has edge and regional information, and further wherein n is 3 or more, is provided. The method comprises the steps of pre-segmenting the target object, generating a mesh for each pre-segmented surface, optimizing the mesh and simultaneously segmenting multiple interacting surfaces of the target object.

In yet another embodiment of the present invention, the pre-segmenting the target object step includes applying an algorithm based on one of the following types: level set, thresholding, region growing, fuzzy connectivity, watershed or graph cut.

In yet another embodiment of the present invention, the pre-segmentation of the target object step includes using edge and regional information of the target object to evolve a surface toward a boundary of the target object.

In yet another embodiment of the present invention, the pre-segmentation the target object step yields a zero level set surface of an n-dimensional function embedded in a volumetric digital grid.

In yet another embodiment of the present invention, the generating a mesh step includes applying an isosurfacing algorithm.

In yet another embodiment of the present invention, the optimizing the mesh step includes removing isolated and redundant triangles.

In yet another embodiment of the present invention, the generating a mesh step includes initializing a graph in a narrow band around pre-segmented target object surfaces.

In yet another embodiment of the present invention, including co-segmenting the multiple interacting surfaces of the target object step by applying a multi-surfaces graph search algorithm.

A method for the simultaneous detection of one or more of a multiple interacting surfaces of a target object having edge and regional information in n-D is provided. The method comprises the steps of pre-segmenting the target object, generating a mesh, optimizing the mesh and co-segmenting the multiple interacting surfaces of the target object.

In yet another embodiment of the present invention, the target object is a closed surface.

In yet another embodiment of the present invention, the target object is a complex-shaped surface.

In yet another embodiment of the present invention, the complex-shaped surface is a medical image having at least three dimensions.

In yet another embodiment of the present invention, the co-segmenting the multiple interacting surfaces of the target object step includes applying a multi-surfaces graph search algorithm.

In yet another embodiment of the present invention, pre-segmenting the target object step includes incorporating a priori knowledge.

In yet another embodiment of the present invention, incorporating a priori knowledge includes incorporating local features that specify the local connections of a possible surface voxel with its neighboring surface voxels.

In yet another embodiment of the present invention, incorporating a priori knowledge includes utilizing shape priors of the target object.

A method for the simultaneous detection of multiple interacting surfaces of a target object in n-D, comprising co-segmenting the multiple interacting surfaces of the target object.

In yet another embodiment of the present invention, a method for the simultaneous detection of multiple interacting surfaces is provided, further including the step of pre-segmenting the target object.

In yet another embodiment of the present invention, a method for the simultaneous detection of multiple interacting surfaces is provided, further including the step of generating a mesh.

In yet another embodiment of the present invention, a method for the simultaneous detection of multiple interacting surfaces is provided, further including the step of optimizing the mesh.

A method for the simultaneous detection of one or more interacting surfaces of a closed surface target object in n-D, comprising pre-segmenting the target object.

In yet another embodiment of the present invention, a method for the simultaneous detection of one or more interacting surfaces of a closed surface target object in n-D is provided, further including the step of generating a mesh.

In yet another embodiment of the present invention, a method for the simultaneous detection of one or more interacting surfaces of a closed surface target object in n-D is provided, further including the step of optimizing the mesh.

In yet another embodiment of the present invention, a method for the simultaneous detection of one or more interacting surfaces of a closed surface target object in n-D is provided, further including the step of co-segmenting the one or more interacting surfaces of the target object.

In yet another embodiment of the present invention, a method for the simultaneous detection of one or more interacting surfaces of a closed surface target object in n-D is provided, where the pre-segmenting the target object step includes the step of incorporating a priori knowledge.

In yet another embodiment of the present invention, a method for the simultaneous detection of one or more interacting surfaces of a closed surface target object in n-D is provided, where the incorporating a priori knowledge step includes incorporating local features that specify the local connections of a possible surface voxel with its neighboring surface voxels.

In yet another embodiment of the present invention, a method for the simultaneous detection of one or more interacting surfaces of a closed surface target object in n-D is provided, where the incorporating a priori knowledge includes utilizing shape priors of the target object.

A method for approximately optimizing a piecewise-constant Mumford-Shah functional for a target having a target surface is provided. The method comprises the steps of estimating a mean intensity in an interior and an exterior of the target surface and computing a cost for each voxel.

In yet another embodiment of the present invention, estimating a mean intensity includes distinguishing the interior and the exterior of the target surface.

In yet another embodiment of the present invention, the interior of the target surface is all voxels on or below the target surface.

In yet another embodiment of the present invention, the exterior of the target surface is all voxels above the target surface.

In yet another embodiment of the present invention, estimating the mean intensity includes defining an interior cone and an exterior cone for each voxel.

In yet another embodiment of the present invention, the interior cone of a first voxel is a subset of voxels in the interior of any feasible surface passing the first voxel.

In yet another embodiment of the present invention, the exterior cone of a second voxel is a subset of voxels in the exterior of any feasible surface passing the second voxel.

In yet another embodiment of the present invention, estimating a mean intensity includes computing a mean intensity of the interior cone of each voxel.

In yet another embodiment of the present invention, estimating a mean intensity includes computing a mean intensity of the exterior cone of each voxel.

In yet another embodiment of the present invention, computing the cost of each voxel includes calculating the sum of an inside variance and an outside variance of the column of each voxel.

In yet another embodiment of the present invention, the inside variances of the column of a first voxel is the total sum of the squared differences between the intensity of each voxel on or below the first voxel on the column and the mean intensity of the interior cone of the first voxel.

In yet another embodiment of the present invention, the outside variances of the column of a first voxel is the total sum of the squared differences between the intensity of each voxel above the first voxel on the column and the mean intensity of the interior cone of the first voxel.

A method for simultaneous detection of multiple terrain-like surfaces of a target object is provided. The method comprises the steps of building a weighted directed graph for each surface of the target object in an n-D geometric graph, determining an optimal closed set and resolving an upper envelope of the non-empty minimum-cost closed set.

In accordance with yet another embodiment of the present invention, a method for simultaneous detection of multiple terrain-like surfaces of a target object is provided, where the building a weighted directed graph step for each surface of the target object includes assigning each of the nodes within the n-D geometric graph to an individual voxel in an n-D input image.

In accordance with yet another embodiment of the present invention, a method for simultaneous detection of multiple terrain-like surfaces of a target object is provided, where the building a graph step includes assigning a cost value to each of the nodes and determining the cost value from the n-D input image.

In accordance with yet another embodiment of the present invention, a method for simultaneous detection of multiple terrain-like surfaces of a target object is provided, where the building a weighted directed graph step includes constructing edges of the graph by connecting each of the nodes to each of the nodes positioned bottommost and neighboring to the node in an adjacent column and building vertical edges along each column.

In accordance with yet another embodiment of the present invention, a method for simultaneous detection of multiple terrain-like surfaces of a target object is provided, where the building a weighted directed graph step includes transforming the weighted directed graph.

In accordance with yet another embodiment of the present invention, a method for simultaneous detection of multiple terrain-like surfaces of a target object is provided, where the transforming the weighted directed graph step includes subtracting a target nodes cost value by the cost of each of the adjacent beneath nodes cost value.

In accordance with yet another embodiment of the present invention, a method for simultaneous detection of multiple terrain-like surfaces of a target object is provided, where the transforming a weighted directed graph step includes, if the sum of the bottom-most nodes cost value is greater than or equal to zero, selecting any one or more of the bottom-most nodes and subtracting the cost value of the selected bottom-most node by any value greater than the sum.

In accordance with yet another embodiment of the present invention, a method for simultaneous detection of multiple terrain-like surfaces of a target object is provided, where the determining an optimal closed set includes computing a minimum-cost closed set of the graph by transforming a node-weighted directed graph into an edge-weighted directed graph, including adding a start node having multiple connecting edges to each node that has a negative cost value to the weighted directed graph and calculating a terminal node having multiple connecting edges to each node that has a non-negative cost to the weighted directed graph.

In accordance with yet another embodiment of the present invention, a method for simultaneous detection of multiple terrain-like surfaces of a target object is provided, where each of the connecting edges of the multiple connecting edges is assigned a capacity that is equal to an absolute value of each of the nodes cost values to which each connecting edge is connected.

In accordance with yet another embodiment of the present invention, a method for simultaneous detection of multiple terrain-like surfaces of a target object is provided, where the determining a non-empty minimum-cost closed set step includes computing a maximum flow from the start node to the terminal node.

In accordance with yet another embodiment of the present invention, a method for simultaneous detection of multiple terrain-like surfaces of a target object is provided, where the resolving an upper envelope of the minimum-cost closed set includes computing the voxels corresponding to the topmost nodes along the n-th dimension in the minimum-cost closed set.

A system for simultaneous detection of multiple interacting surfaces of a target object is provided. The system preferably includes an image acquisition device for receiving target object data and converting the target object data into a machine readable format. The system also preferably includes a computer having software able to receive the machine readable format of the scanned target object, wherein the software builds a weighted directed graph for each surface of the target object, determines an optimal non-empty minimum-cost closed set, determines an upper envelope of the non-empty minimum-cost closed set, and where the upper envelope is utilized in order to detect multiple interacting surfaces of a target object.

In accordance with yet another embodiment of the present invention, a system or simultaneous detection of multiple interacting surfaces of a target object is provided and preferably includes an image display device for displaying the target object as a volumetric image.

The present invention also includes multi-object image analysis using graph search applications including objective functions that incorporate non-uniform cost terms such as "on-surface" costs as well as "in-region" costs as described in U.S. application Ser. No. 12/0041,066, incorporated in its entirety by reference.

The multi-object image segmentation method comprises the steps of representing n-dimensional image data as an m-dimensional structure, calculating a cost functional related to the m-dimensional structure, specifying the smoothness constraints of boundary surfaces of the m-dimensional structure, and segmenting the n-dimensional image data in multiple objects using the cost functional of the calculating step and the smoothness constraints of the specifying step.

In accordance with yet another embodiment of the present invention, a method for image segmentation is provided by representing n-dimensional image data as a m-dimensional structure to form an image representation. One or more regions of a q-ary object interaction is formed to form a specified q-ary inter-object relationship. A cost functional related to the m-dimensional structure and the one or more regions of the q-ary object interaction is calculated and the n-dimensional image data in one or more layer surfaces of multiple objects is segmented using the cost functional, the image representation, and the specified q-ary inter-object relationship to produce segmented layers.

In yet another embodiment of the present invention, the method further comprises the step of utilizing quantitative analysis of one or more segmented layers.

In yet another embodiment of the present invention, the n-dimensional image data represents a medical image, an orthopedic image, a volumetric image, or a pelvis image.

In yet another embodiment of the present invention, the cost functional includes cost terms that are obtained from a combination of one or more of the following feature term categories selected from the group comprising of image properties, global smoothness constraints of one or more boundary surfaces of the m-dimensional structure, local smoothness constraints of one or more boundary surfaces of the m-dimensional structure, object-independent smoothness constraints of one or more boundary surfaces of the m-dimensional structure, object-specific smoothness constraints of one or more boundary surfaces of the m-dimensional structure, q-ary object interactions, optimally selected features selection, training examples, regions of object interaction, expert-designed features, imaging modalities, and patient characteristics.

In accordance with yet another embodiment of the present invention, the calculating step is performed in an optimal fashion.

In yet another embodiment of the present invention, the method further comprises the step of using a graph-search approach.

In yet another embodiment of the present invention, the method further comprises the step of employing one or more graph image representations to describe the m dimensional structure and q-ary object interaction.

In yet another embodiment of the present invention, the one or more graph image representations enforces boundary surface smoothness constraints.

In accordance with yet another embodiment of the present invention, the method further comprises the step of identifying individual layer-separating surfaces.

In accordance with yet another embodiment of the present invention, the method further comprises the step of establishing correspondence between the surfaces of interacting objects to form individual-object graph representations to enforce the q-ary object interactions.

In yet another embodiment of the present invention, the corresponding step further comprises the step of calculating an approximating separating surface.

In yet another embodiment of the present invention, the approximating separating surface is a medial sheet.

In yet another embodiment of the present invention, the establishing step further comprises the step of modifying topology of one or more individual-object graph representations.

In yet another embodiment of the present invention, the segmenting step is performed simultaneously for two or more of the layer surfaces.

In yet another embodiment of the present invention, the method further comprises the step of using an optimal multi-layer graph-search approach.

In yet another embodiment of the present invention, the utilizing step includes one or more of the following characteristics selected from the group comprising of morphologic characteristics, textural characteristics, and functional characteristics.

In yet another embodiment of the present invention, the characteristics represent properties of the one or more segmented layers or any portion or portions of the one or more segmented layers.

In yet another embodiment of the present invention, the quantitative analysis includes one or more characteristics selected from the group comprising of morphologic characteristics, textural characteristics, and functional characteristics.

In yet another embodiment of the present invention, the characteristics represent global or local properties of one or more selected from the group comprising of an individual object, an object part, or an object combination.

In yet another embodiment of the present invention, the utilizing step further comprises the step of exporting the quantitative analysis as a report.

In yet another embodiment of the present invention, utilizing step further comprises the step of storing the quantitative analysis on a storage medium.

In accordance with yet another embodiment of the present invention, the storage medium is one selected from the group comprising of paper and computer disk.

In yet another embodiment of the present invention, the utilizing step is visualized in a form corresponding to the representation of the segmented layers of the segmenting step.

The present invention and its attributes and advantages will be further understood and appreciated with reference to the detailed description below of presently contemplated embodiments, taken in conjunction with the accompanying Figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows a comparison of observer-defined and computer-segmented inner and outer airway wall surfaces according to the present invention;

FIG. 15 shows cartilage/non-cartilage region definitions for various knee parts according to the present invention;

DETAILED DESCRIPTION OF THE INVENTION

Figure 1C:
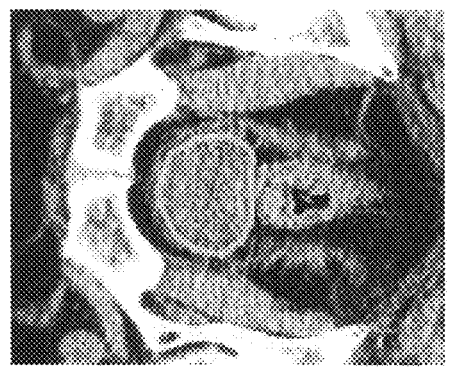
FIG. 1 shows scanned images that depict the Active Appearance Model matching process according to the present invention.

The present invention is directed to a number of imaging applications. Application examples include segmentation of single surfaces, e.g., segmentation of the diaphragm from volumetric CT images, or a 4-D extension of identifying diaphragm motion over time; segmentation of vessel wall layers in 3-D image data, e.g., from intravascular ultrasound or magnetic resonance and its 4-D extension of detecting the vessel wall surfaces over an entire cardiac cycle; segmentation of airway walls in individual airway tree segments from volumetric CT images, its topology-changing extension to identify surfaces of complete trees; tracking of such surfaces over time during the breathing cycle or—for vascular trees—over the cardiac cycle; segmentation of liver or kidney surfaces, tumor surfaces, as well as surfaces of bones, joints, or associated cartilages; surfaces separating cerebro-spinal fluid, gray matter and white matter in the brain, or possibly surfaces of deep anatomical structures in the brain, and even ocular disease including glaucoma, diabetic macular edema and optic neuropathy.

It is to be appreciated that imaging for use in embodiments of the present invention can be achieved utilizing traditional scanners or any other image acquisition technique as would be appreciated by those having ordinary skill in the art.

It is to be understood that while the present invention is described with particularity with respect to medical imaging, the principles set forth in detail herein can be applied to other imaging applications. For example, other areas of application include geological, satellite imaging, entertainment, image-guided therapy/surgery and other applications as would be appreciated by those skilled in the art. Similarly, the principles can be applied to any n-D data sets containing non-image information. For the purposes of this application, an image is any scalar or vector function on n-dimensional coordinates, in which function values are representing some measurable property or a set of measurable properties associated with the said coordinates.

I. Graph Search Applications with Objective Functions Incorporating "on-Surface" Costs A. Optimal 2-D Border 1. Optimal Border Detection in Intravascular Ultrasound In accordance with one embodiment of the present inventive methods, accurate geometric representations of coronary arteries in vivo are generated from fusion of biplane angiography and IVUS with subsequent morphologic and hemodynamic analyses in 3-D and 4-D. One method in accordance with the present invention for segmenting the IVUS frames for a 4-D fusion study combines the optimal graph search approach with a cost function based on a feature set composed of image data terms (e.g., edge detectors and intensity patterns), physics-based terms (e.g., ultrasound Rayleigh distribution), and terms from expert-traced examples. A scoring system is employed to evaluate these three feature classes in each image to be analyzed, and the borders are found using a multi-resolution approach that mimics human vision. When employing this IVUS segmentation system in a full automated mode, a success rate of 68% is achieved, with mean border positioning errors of 0.13±0.08 mm. The lack of 3-D (and 4-D) context and the fact that the individual borders are identified sequentially and not simultaneously adversely affect the method's performance.

2. Automated Design of Segmentation Criteria from Examples

When applying a general image segmentation method to a specific segmentation problem, a complete or partial redesign of the segmentation algorithm is usually performed to cope with different properties of borders that need to be identified. To avoid repeating this time-consuming step for which an image analysis expert is needed, an embodiment of the present invention utilizes a method for automated design of border detection criteria from examples. All information necessary to perform image segmentation is automatically derived from a training set that is presented in a form of expert-identified segmentation examples. The training set is used to construct two models representing the objects—Shape Model and Border Appearance Model. The designed objective function was employed in an optimal graph-search based border detection method that was tested in five different segmentation tasks—489 objects were segmented. The final segmentation was compared to manually defined borders with good results [rms errors in pixels: 1.2 (cerebellum), 1.1 (corpus callosum), 1.5 (vertebrae), 1.4 (epicardial) and 1.6 (endocardial) borders].

3. MR Segmentation of Arterial Wall and Plaque

In accordance with another embodiment of the present invention, methods a semi-automated approach was developed for segmenting lumen-intima border, internal elastic lamina (IEL—border between intima+plaque and media), and external elastic lamina (EEL—border between media and adventitia) in MR images of diseased arterial specimens. Two-dimensional graph-search based optimal border detection was used to segment image slices. Due to limited in-slice resolution and the partial volume effect, and due to the lack of 3-D context when employing the 2-D sequential border detection method, the automated detection of arterial wall layers was locally failing and required interactive identification of boundary points through which the automated borders must pass. The performance of the border detection method was tested in 62 T1-weighted MR images acquired from six human femoral specimens (1.2 mm thick slices, 0.3 mm/pixel). The border detection method in accordance with an embodiment of the present invention successfully determined lumen, IEL, and EEL borders in all 62 MR images, after 2.4 manually identified points were provided for each image slice. Then, the mean absolute border positioning errors for the lumen, IEL, and EEL borders were 1.0:1±0.2 pixel (0.3:1±0.1 mm). The same data shows the feasibility of a fully automated 3-D (not slice-by-slice) segmentation of arterial wall layers in MR images.

Figure 1B:
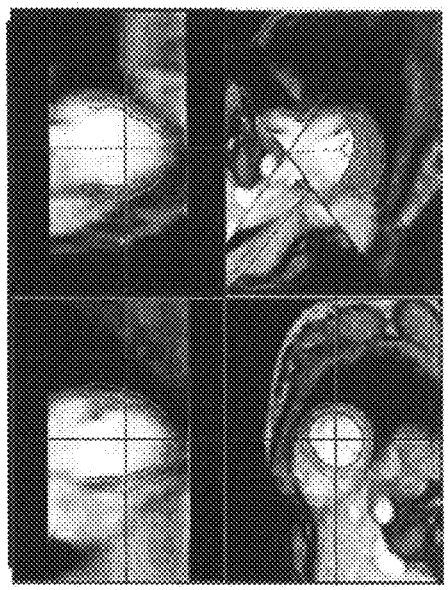
Figure 1A:
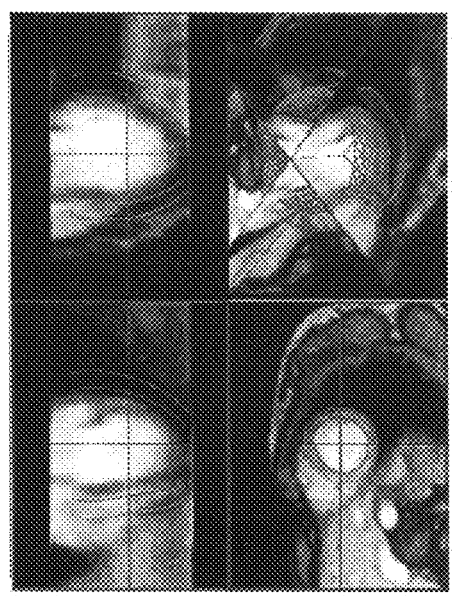

FIG. 1 shows the use of an MM matching process in accordance with an embodiment of the present invention. The initial position of the model (a) in the cardiac MR volumetric data set is shown. The final match of a 3-D cardiac AAM is shown at (b). The straight lines show the position of frames in the other two cutting planes. A matched prostate AAM in X-ray CT is shown at (c).

B. 3-D Segmentation Using Active Appearance Models and Fuzzy Connectivity

1. Cardiac Image Segmentation using Active Appearance Models

The AAM in accordance with the present invention is an extension to previous techniques and offers a fully automated hybrid AAM approach to LV and RV segmentation in mid-ventricular short-axis MR images that significantly outperform prior AAM approaches such as the approach of Cootes and Taylor. Moreover, a semi-automated method for segmentation of temporal sequences of 2-D echo cardiographic images and temporal sequences of 2-D MR mid-ventricular short-axis images has been developed. In addition, the present invention includes a fully automated 3-D AAM-based, left-ventricular MR segmentation which has been validated in human clinical images. The AAM approach is developed from manually-traced segmentation examples during an automated training stage. The shape and image appearance of the cardiac structures are contained in a single model. This ensures a spatially and/or temporally consistent segmentation of 3-D cardiac images. To overcome the well-known problem of identifying corresponding landmarks within shapes, a fully automated landmarking technique based on deformable templates was developed to form an average atlas image using shape-based blending. Short-axis and long-axis views can be combined to form a single volume and thus allow the representation of the ventricles as closed surfaces. Each individual sample is then elastically registered onto the mean shape and landmarks are defined on the mean shape using marching tetrahedrons and decimation of the triangular vertices.

Three-dimensional MM in accordance with one embodiment of the present invention can also be preferably applied to segmenting temporal sequences of echo cardiographic images. While the method offers full automation with no human interaction, the model-based character may decrease the segmentation accuracy by preferring segmentations that are close to the average model—which may cause problems with analysis of diseased cases. To overcome this problem, one embodiment of the present invention includes multi-view AAMs and multi-stage AAMs in which an AAM step is used to approximately segment the object of interest (cardiac ventricles), followed by a 2-D slice-by-slice optimal graph search step for accurate border determination.

2. Pulmonary Image Segmentation using Fuzzy Connectivity

Determination of intrathoracic airway trees is a necessary prerequisite to their quantitative analysis. One embodiment of the present invention comprises a new method for segmentation of intrathoracic airway trees from multi-detector CT images that is based on fuzzy connectivity. The method is robust in the sense that it works on various types of scans (low and regular doses, normal and diseased subjects) without the need for the user to manually adjust any parameters. The method offers good localization. To provide accurate delineation of the borders, additional slice-by-slice 2-D border detection using optimal graph searching is employed that significantly improved the overall border positioning accuracy ($p<0.001$).

FIG. 2 shows level set segmentation in accordance with one embodiment of the present invention. Segmentation of coronary arteries from micro CT data of mouse hearts is shown at (a). MIP of segmented left coronary artery superimposed over the original image. A 3-D surface rendering of the segmentation result is shown at (b). A single frame of a temporal microscopic image data set is depicted at (c). Cells are identified in a 3-D image (2-D plus time). Level set segmentation of human in vivo airway tree imaged using low-dose CT is shown at (d).

3. Level Sets

Figure 2A:
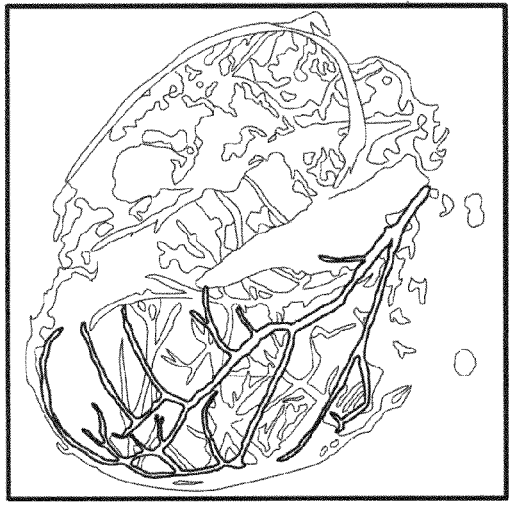
FIG. 2 shows examples of level set segmentation according to the present invention.
Figure 2B:
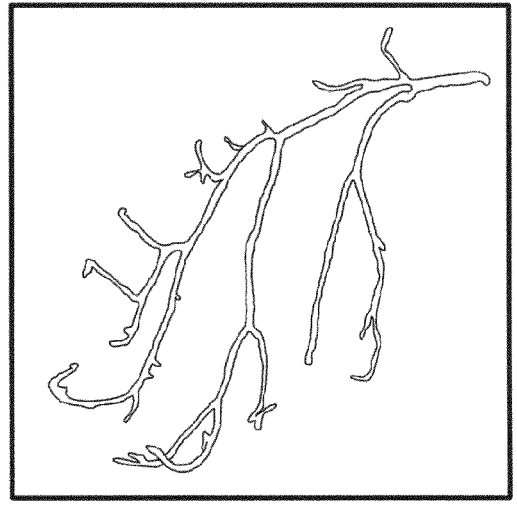
Figure 2C:
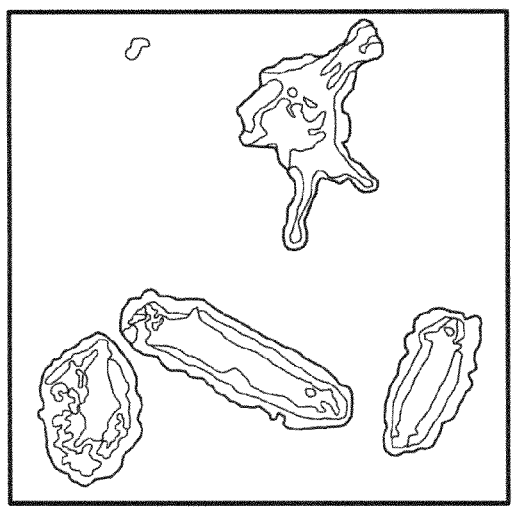
Figure 2D:
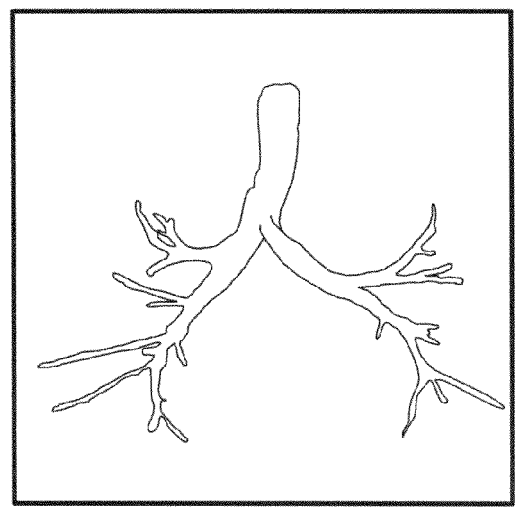
Figure 3A:
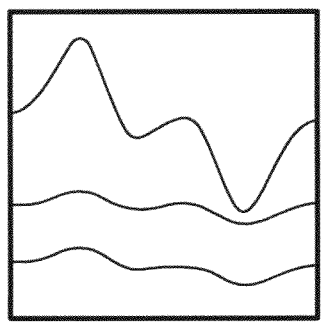
FIG. 3 shows the effect of intra-surface smoothness constraints according to the present invention.
Figure 3B:
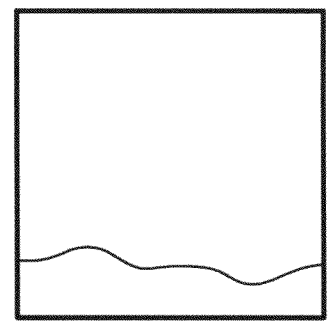
Figure 3C:
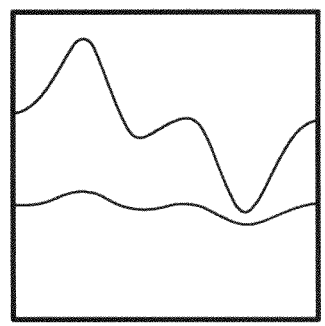
Figure 3D:
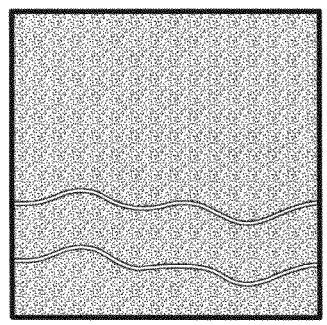
Figure 3E:
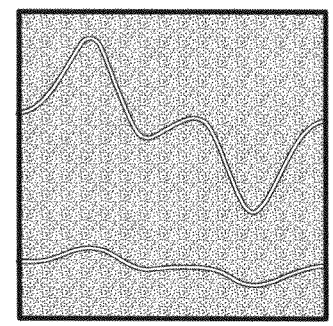
Figure 4A:
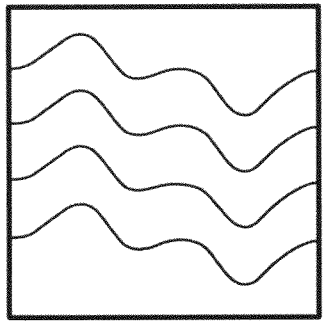
FIG. 4 shows the effect of surface separation constraints according to the present invention.
Figure 4B:
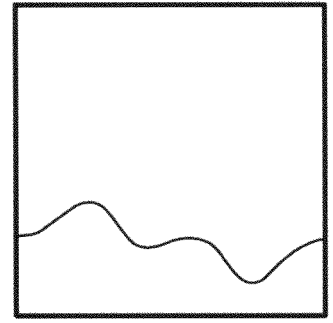
Figure 4C:
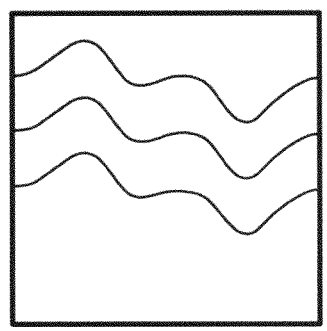
Figure 4D:
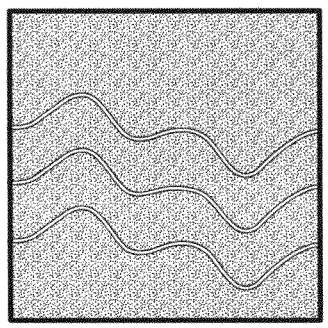
Figure 4E:
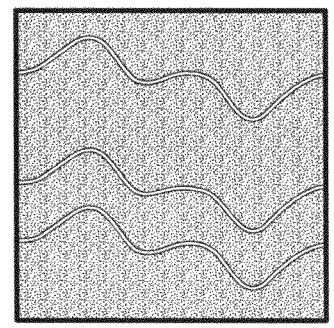

Geometric deformable models whose objective functions are represented implicitly as level sets of higher-dimensional scalar level set functions and that evolve in an Eulerian fashion, are independent of the parameterization of the evolving contour. The propagating contour can naturally change topology in the geometric models. Level set-based segmentation can be used in a number of medical image analysis projects; for example, a project employing the Eikonal equation $|\nabla T|F=1$ based 3-D Fast Marching Method with the speed defined as $$F = \frac{\mathrm{Sigma}(I)}{\mathrm{Max}(\mathrm{Sigma}(I))} + const$$

to extract coronary arteries from the volumetric micro CT images of mouse hearts and using them for structural tree measurement (FIG. 2(a), (b)). Sigma is a 3-D Sigma Filter. Level sets for segmentation of living cells can be employed in temporal sequences of microscopic images. In this case, 3-D Fast Marching and Narrow Band Methods are both applied with a function of the eigenvalues corresponding to the maximal and minimal changes of the local variance to control the moving front. The function is defined as $g_{col} = e^{-(\lambda_+(L(I))-\lambda_-(L(I)))}$, where $\lambda_+$ is the maximal eigenvalue, $\lambda_-$ is the minimal eigenvalue, and L is the local variance. A modified level set method was tested in the pulmonary airway tree segmentation from low dose CT data set. Here, the gradient function $F = e^{-(\nabla G_\sigma * I)}$ and a set of symmetric rules are combined to control the moving front.

C. Optimal Surface Detection in 3-D

One embodiment of the present invention uses the theoretical algorithm of Wu and Chen in a preliminary fashion and as applied to computer phantoms and a limited set of medical images. The method's feasibility was explored on computer phantoms that contained two or more non-crossing surfaces with various shapes and mutual positions, and more specifically those having sizes ranging from 30×30×30 to 266×266× 266 voxels, blurred (σ=3.0), and with Gaussian noise of σ=0.001 to 0.2). The first group of 3-D phantoms contained three separate surfaces embedded in the image to identify two of the three surfaces based on some supplemental surface properties (smoothness), as depicted in FIGS. 3 and 4.

FIG. 3 shows the effect of intra-surface smoothness constraints. FIG. 3(a) shows a cross-section of the original 3-D image. First (b) and second (c) cost images. Results obtained with smoothness parameters $\Delta_x = \Delta_y = 1$ are shown in (d); smoothness parameters $\Delta_x = \Delta_y = 5$ (e).

FIG. 4 shows the effect of surface separation constraints. Cross-section of the original 3-D image is depicted in (a). A first cost image is depicted in (b), while the second and third cost images are depicted in (c). The results (shown in (d) and (e)) are obtained with separation parameters favoring specific surface detection pattern.

Figure 5F:
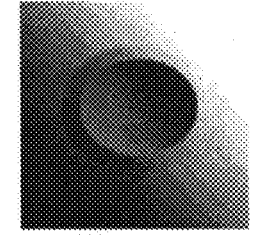
FIG. 5 shows a comparison of single surface detection versus coupled surface detection according to the present invention.
Figure 5E:
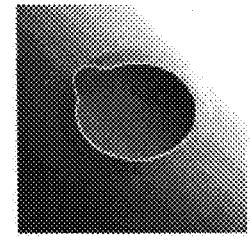
Figure 5D:
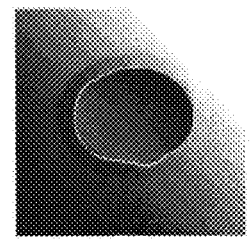
Figure 5C:
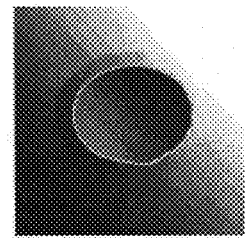
Figure 5B:
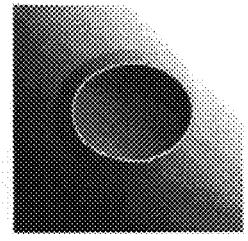
Figure 5A:
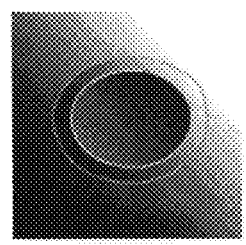
Figure 6A:
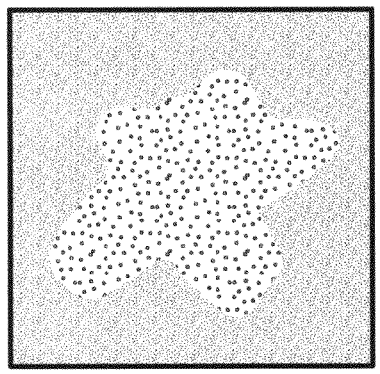
FIG. 6 shows segmentation examples using the minimum-variance cost function according to the present invention.
Figure 6B:
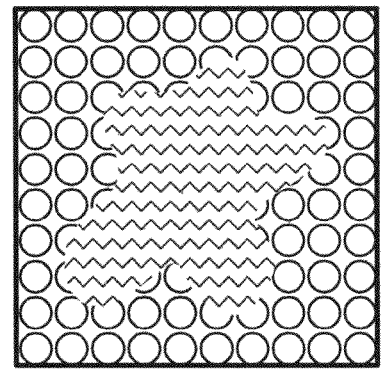
Figure 6C:
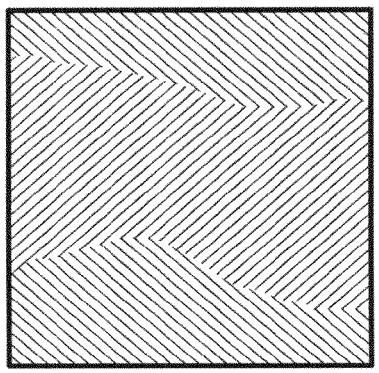
Figure 6D:
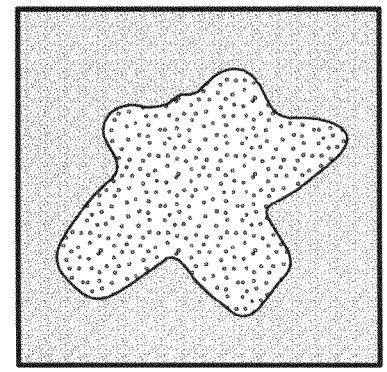
Figure 6E:
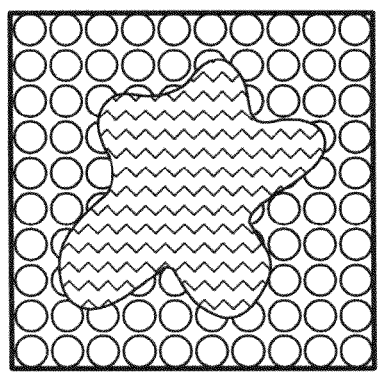
Figure 6F:
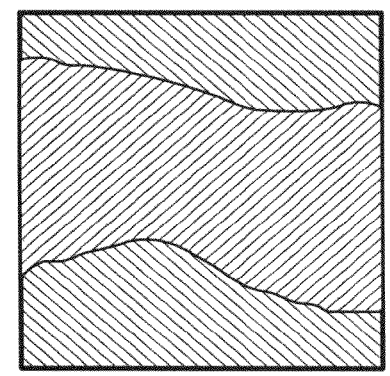

To verify the effectiveness of various cost function formulations, a second group of phantoms was used containing differently textured regions or shapes. A volumetric image cross section is shown in FIG. 5a. The gradual change of intensity causes the edge-based cost function to locally fail (FIG. 5b). By using an appropriate cost function, the inner elliptical boundary could be successfully detected using the 2-D MetaMorphs method developed by Huang et al. ("Huang") when attempting to segment the inner contour in one image slice (FIG. 5c, d). Huang's method combines the regional characteristics (Mumford-Shah style texture term) and edge properties (shape) of the image into a single model. The approach implemented in accordance with the present invention uses a cost function formulated in the same way as Huang's shape term and produces an equally good result as the MetaMorphs model (FIG. 5(e)). FIG. 5(f) demonstrates the ability to segment both borders of the sample image. In comparison, the current MetaMorphs implementation cannot segment the outer contour.

FIG. 5 shows single-surface detection versus coupled-surface detection. The cross-section of the original image is shown in FIG. 5(a). FIG. 5(b) shows single surface detection with standard edge-based cost function. FIG. 5(c) depicts the MetaMorphs method segmenting the inner border in 2-D, while FIG. 5(d) shows MetaMorphs with the texture term turned off. FIG. 5(e) depicts single surface detection and a cost function with a shape term. Double-surface segmentation is shown in 5(f).

FIG. 6 depicts segmentation using the minimum-variance segmentation results. The original images are shown in (a), (b) and (c). The segmentation results are shown in (d), (e) and (f).

FIG. 6 presents segmentation examples using the minimum-variance cost function. The objects and background were differentiated by their different textures. In FIG. 6(a), (d), the cost function was computed directly on the image itself. For FIG. 6(b), (e) and FIG. 6(c), (f), the curvature and edge orientation in each slice were used instead of the original image data. The two boundaries in FIG. 6(c), (f) were segmented simultaneously.

Figure 7A:
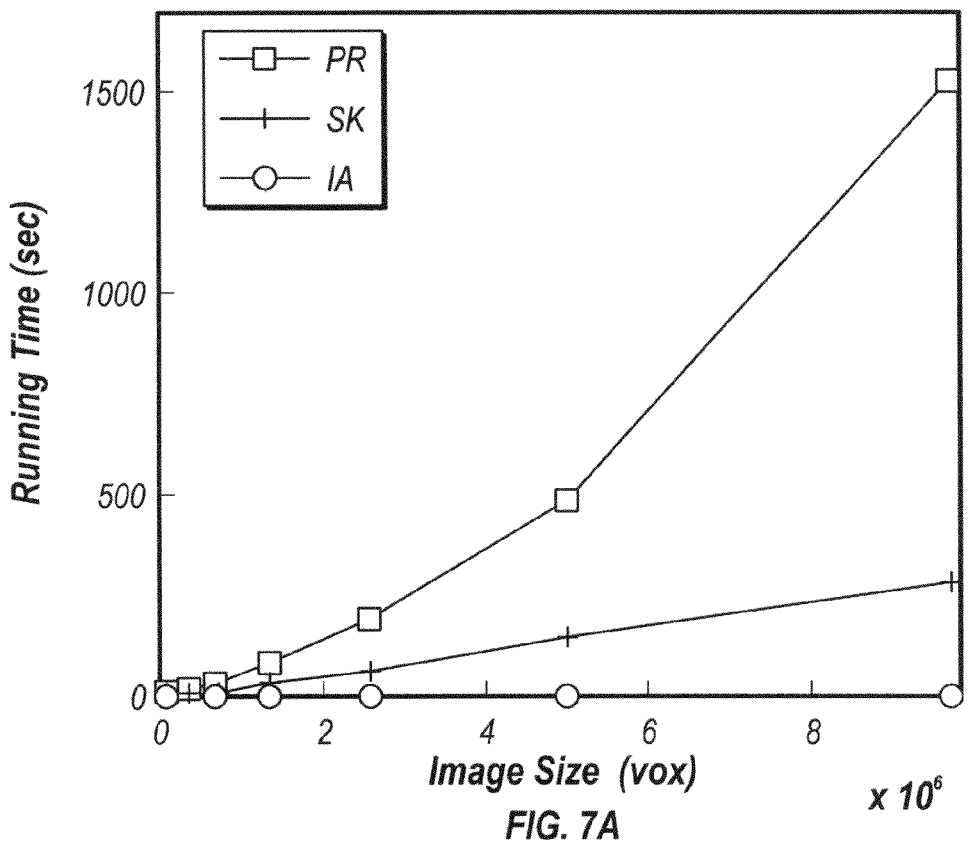
FIG. 7 shows execution time comparisons of single surface detection versus multiple surface detection according to the present invention.
Figure 7B:
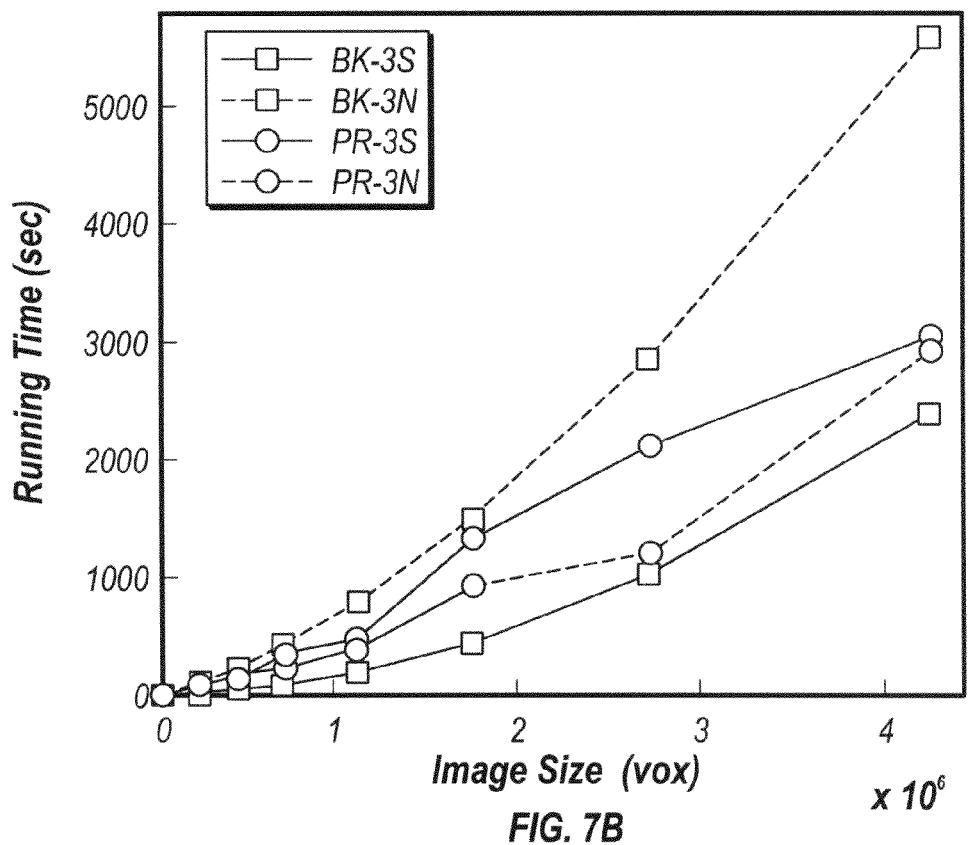

Execution time comparisons are shown at FIG. 7. FIG. 7(a) shows the single-surface detection case. FIG. 7(b) shows the execution times in smooth and noisy cost functions for triple-surface detection (3S=smooth, 3N=noisy). The average execution times (in seconds) are shown in FIG. 7(c).

Comparisons of different implementations of the proposed algorithms for the single, double and triple surfaces detection cases are shown in FIG. 7. All experiments were conducted on an AMD Athlon MP 2000+ (1.67 GHz) Dual CPU workstation with 3.5 GB of memory. The Boykov-Kolmolgorov ("BK") implementation was found to perform better when the cost function was smooth and k (that is, the number of surfaces to be segmented) was small, as were the cases in FIG. 7(a), (b). However, cost functions that exhibit many local minima and a larger k tend to push the algorithms to the worst case performance bound. When this happens, the push-relabel ("PR") implementation tends to be more efficient. By exploiting the regularity in the graph edge structure, the "implicit-arc" ("IA") graph representation was shown to improve both the speed and memory efficiency (50% shorter times compared to "forward star"). The average execution times of the simultaneous k-surface (k=2, 3) detection algorithm are shown in FIG. 7(c) for the implementation using the BK maximum flow algorithm on a "forward-star" represented graph.

1. Feasibility of Optimal Multiple Surface Detection

In accordance with embodiments of the present invention, pilot implementation can be used to demonstrate the feasibility of detecting the inner and outer wall surfaces of the intrathoracic airways. Twelve in-vivo CT scans were acquired from six patients at the total lung capacity (TLC, at 85% lung volume) and functional residual capacity (FRC, at 55% lung volume). The scans had a nearly isometric resolution of 0.7×0.7×0.6 mm³ and consisted of 512×512×(500-600) voxels each. In agreement with embodiments of the present invention to airway tree segmentation and quantification, the multi-seed fuzzy-connectedness technique was used to pre-segment the trees to provide approximate spatial locations of the individual airway segments. The centerlines of the airway branches were obtained by applying a skeletonization algorithm. Each airway segment between two branch points was resampled so that the slices in the resampled volumes were perpendicular to the respective centerlines. After this step, about 30 resampled airway segments may be obtained from each CT dataset. The employed cost function was a combination of the first and second derivatives of 2-D gray-level images and was identical for the 2-D slice-by-slice and the 3-D analysis.

Figure 8:
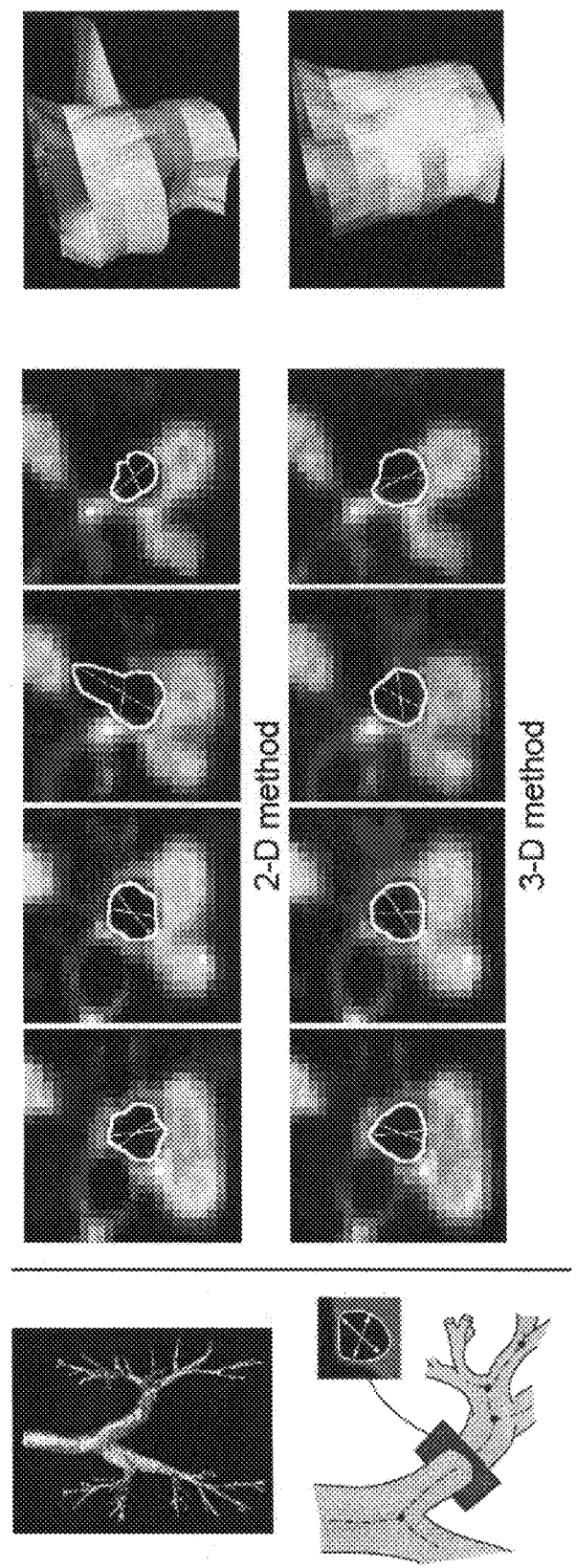
FIG. 8 shows a comparison of various methods of inner airway wall segmentation according to the present invention.
Figure 10F:
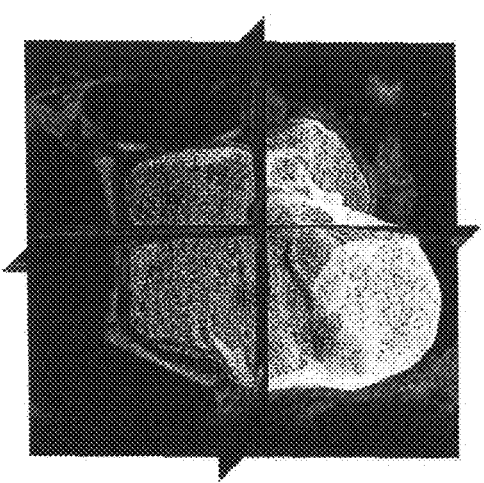
FIG. 10 shows three-dimensional magnetic resonance arterial wall segmentation and three-dimensional magnetic resonance ankle cartilage segmentation according to the present invention.
Figure 10E:
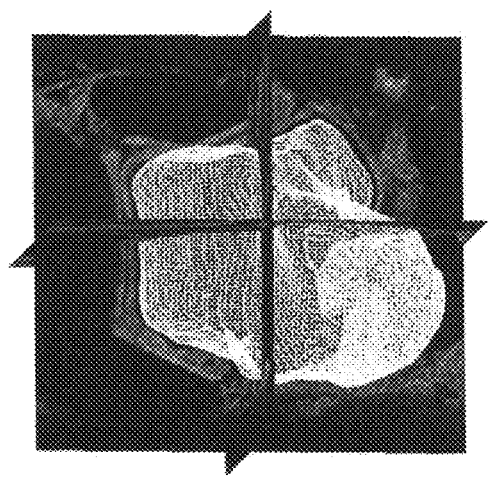
Figure 10B:
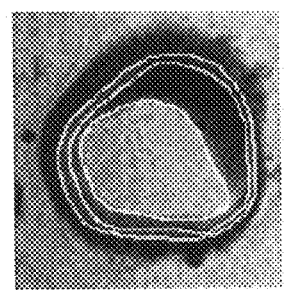
Figure 10D:
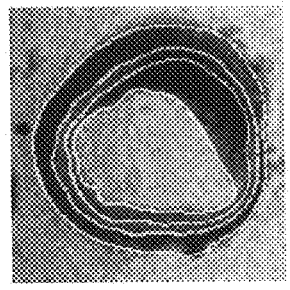
Figure 10A:
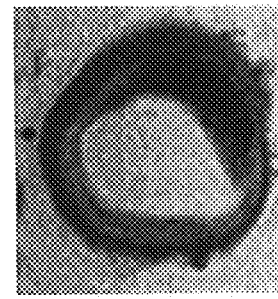
Figure 10C:
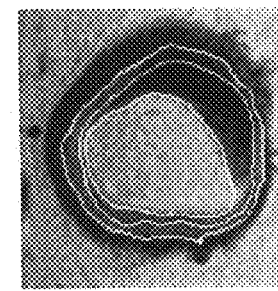

FIG. 8 depicts comparison of inner airway wall segmentation results. The top left panel portion shows an in-vivo airway tree segmented using the fuzzy connectivity approach. While the tree structure is well depicted, the obtained surface does not correspond to the airway wall boundaries. The bottom left panel demonstrates resampling of airway segments to obtain orthogonal slices on which the slice-by-slice border detection is performed. The top right panel shows the results of the slice-by-slice dynamic programming approach in 4 consecutive slices together with 3-D surface rendering of the entire segment (10 slices). The bottom right panel shows the same segment with the luminal surface detected using the optimal 3-D graph searching approach.

FIG. 9 provides a comparison of observer-defined and computer-segmented inner and outer airway wall surfaces in 3-D airway segments. FIG. 9(a) shows expert-traced borders in a specific cross section. FIG. 9(b) shows 3-D surface obtained using double-surface 3-D segmentation method (identical cross sections shown).

As shown in FIG. 8, inner wall surfaces are visible in CT images, whereas outer airway wall surfaces are very difficult to segment due to their blurred and discontinuous appearance and/or adjacent blood vessels. The currently used 2-D dynamic programming method works reasonably well for the inner wall segmentation but is unsuitable for the segmentation of the outer airway wall (FIG. 8). By optimizing the inner and outer wall surfaces and considering the geometric constraints, the presently inventive approach produces good segmentation results for the inner and outer airway wall surfaces in a robust manner (FIG. 9).

The algorithm in accordance with the present invention was also examined by segmenting the vascular wall layers in a pilot set of 4 in vitro volumetric MR images (64 slices) acquired from 4 human femoral specimens (see FIG. 10(a)-(d)). Using a cost function that includes terms reflecting edge strength and direction, the segmentation simultaneously identifies four vascular wall surfaces—lumen-intima surface, internal elastic lamina ("IEL," that is, the interface between intima and media), external elastic lamina ("EEL," the interface between media and adventitia), and adventitia. To demonstrate the accuracy of the presently inventive method, the lumen, IEL and EEL surfaces were compared to the previously defined independent standard. The 3-D graph search for multiple surfaces was fully automatic and did not require any user interaction. The 2-D slice-by-slice method, disclosed herein, required on average 2.4 guiding mouse clicks for each image slice, or about 150 mouse clicks for the 4 analyzed vessel samples. Comparing to the results obtained by the interactive 2-D dynamic-programming based approach previously reported, the presently inventive 3-D approach showed higher accuracy and 3-D consistency.

FIG. 10 shows both 3-D MR arterial wall segmentation and 3-D MR ankle cartilage segmentation. FIG. 10(a) shows two original segmentation slices. Manually identified lumen IEL and EEL borders are shown at 10(b). Surfaces, (c), segmented by 2-D dynamic programming. On average, 2.4 interaction points per frame are needed. The results, shown in (d), yielded by pilot implementation of the proposed fully automated 3-D algorithm. Pilot implementation, in (e), simultaneously segmenting 4 bone and cartilage surfaces in 3-D (100 slices).

D. Examples and Methods

Efficient detection of globally optimal surfaces representing object boundaries in volumetric datasets is important in many medical image analysis applications. Embodiments of the present invention deal with a specific problem of detecting optimal single and multiple interacting surfaces in 3-D and 4-D. Embodiments of the present invention permit identification of optimal surfaces of cylindrical shapes, closed-surface shapes, and shapes that change topology (e.g., a general tree structure, objects with holes, etc.). Since a priori information about object shape and its variations is frequently critical in medical image segmentation, embodiments of the present invention allow incorporation of such knowledge in the optimal net surface model. The computational feasibility is accomplished by transforming the 3-D graph searching problem to a problem of computing an optimal s-t cut in a weighted directed graph. Combining the guarantee of optimality with an ability to design a problem-specific objective function used in the optimization process allows the methods to be applicable to a wide variety of medical image segmentation problems.

The optimal surface detection problem might appear to be computationally intractable at first sight. Actually, several previous algorithms based on graph searching either had an exponential time complexity or traded the optimality for efficiency. A common feature of those approaches is that they tried to determine the voxels on an optimal surface in a sequential fashion. While the inventive concepts of the present invention are generally illustrated using the 3-D cases, it should be noted that the presently inventive concepts work equally well for the 4-D versions of the problems (in fact, for the higher-D cases as well).

Embodiments in accordance with the present invention preferably first build a graph that contains information about the boundaries of the target objects in the input image, and then search the graph for a segmentation solution.

Given an input 3-D/4-D image, embodiments in accordance with the present invention preferably initially perform a pre-segmentation to obtain an approximation to the (unknown) surfaces for the target object boundaries. This gives useful information about the topological structures of the target objects. Quite a few approximate surface detection methods are available, such as the active appearance models (AAM), level sets, and atlas-based registration. Other surface detection methods could also be utilized, as would be appreciated by those of ordinary skill. For surfaces with a geometry that is known to be relatively simple and that allows an unfolding process (e.g., terrain-like, cylindrical, tubular, or spherical surfaces), pre-segmentation might not be needed, as would be appreciated by those of ordinary skill.

From the resulting approximate surfaces of pre-segmentation (or if it is determined that pre-segmentation is not necessary), a mesh is preferably computed. The mesh is preferably used to specify the structure of a graph $G_B$, called base graph. $G_B$ defines the neighboring relations among voxels on the sought (optimal) surfaces.

Voronoi diagram and Delaunay triangulation algorithms or isosurfacing methods (e.g., the marching cubes) can be used for the mesh generation, as would be appreciated by those skilled in the art. For surfaces allowing an unfolding operation, mesh generation may not be required, since in certain cases a mesh can be obtained easily.

For each voxel v on the sought surfaces, a vector of voxels is created that is expected to contain v. This is done by resampling the input image along a ray intersecting every vertex u of the mesh (one ray per mesh vertex). The direction of the ray is either an approximate normal of the meshed surface at u, or is defined by a center point/line of the target object. These voxel vectors produced by the resampling form a new image.

Next, a weighted directed graph G is preferably built on the vectors of voxels in the image resulted from the resampling. Each voxel vector corresponds to a list of vertices in G (called a column). G is a geometric graph since it is naturally embedded in a n-D space (n>=3). The neighboring relations among voxels on the sought surfaces are represented by the adjacency relations among the columns (vectors) of G, as specified by the edges in the base graph $G_B$. Each column contains exactly one voxel on the sought surfaces. The edges of G enforce constraints on the sought surfaces, such as the smoothness and inter-surface separation constraints. The vertex costs of G can encode edge-based and region-based cost functions. Furthermore, information about the constraints and cost functions of a target segmentation problem can be obtained, e.g., finding information on the smoothness and inter-surface separation constraints using the AAM models.

Graph construction schemes in accordance with embodiments of the present invention preferably seek optimal surfaces that correspond to a structure of interest, called optimal closed set, in the weighted directed graph. Thus, the sought optimal surfaces are preferably obtained by searching for an optimal closed set in the weight directed graph using efficient closed set algorithms in graph theory. Implementation efforts bring a fast graph search computation.

Embodiments in accordance with the present invention preferably produce globally optimal surfaces captured in the weighted directed graph and to run in low degree polynomial time.

1. Example 1: 2-D

To reach an intuitive understanding of the underlying processes, a very simple 2-D example is presented corresponding to a tiny 2×4 image. The graph vertices correspond to image pixels with a cost associated with each vertex (FIG. 11(a)). The goal is to find the "minimum cost path" from left to right. The cost of the path is calculated as the sum of its vertex costs. The list of all paths in the graph includes (considering that the maximum allowed vertical distance between the two next-column vertices of the path is 1): ae, af, be, bf, bg, cf, cg, ch, dg and dh. The minimum-cost path can easily be identified as cg with the cost of 2.

Figure 11A:
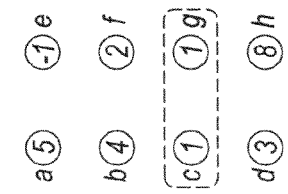
FIG. 11 shows a two-dimensional example of a minimum cost graph-search detection algorithm according to the present invention.
Figure 11B:
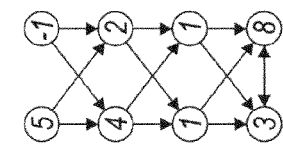

In accordance with one embodiment of the present invention, the edges of the graph are preferably constructed as shown in FIG. 11(b). Cost transformation is performed by subtracting the cost of the vertex immediately below from the cost of the vertex under consideration (FIG. 11(c)). The costs of the bottommost two vertices are left unchanged, unless their cost sum is greater or equal to 0. If so, the sum of the bottom vertex costs is increased by one and subtracted from any single one of the bottommost vertices. In this example, the sum of the bottommost two vertices is 11, vertex d is selected and 12 is subtracted from its cost (FIG. 11(c)). A closed set is a subset of the graph vertices with no edges leaving the set. Every potential path in FIG. 11(a) uniquely corresponds to a closed set in FIG. 11(c). Importantly, the minimum-cost path corresponds to the minimum-cost closed set in FIG. 11(c). FIG. 11 depicts simple 2-D example of the proposed minimum cost graph-search detection algorithm.

To compute the minimum-cost closed set of the graph, a transform to an edge-weighted directed graph is performed. Two new auxiliary vertices are added to the graph—a start vertex s with a connecting edge to every negative-cost vertex, and a terminal vertex t with an edge from every non-negative-cost vertex. Every edge is assigned a capacity. The capacities of the edges from the start vertex and to the terminal vertex are the absolute values of the costs of the vertices they are connected to (from) (FIG. 11(d)). All other edges have infinite capacity. The vertex costs are no longer used and are ignored. The minimum-cost closed set of the graph in FIG. 11(c) can be obtained by computing the Minimum s-t Cut or Maximum Flow from s to t in the graph.

Figure 11C:
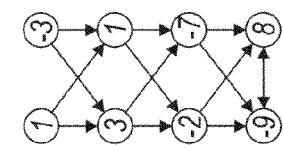
Figure 11D:
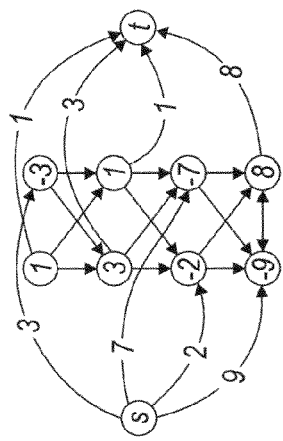
Figure 11E:
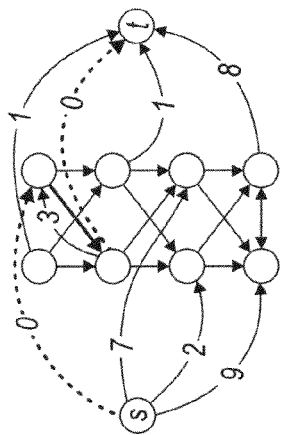
Figure 11F:
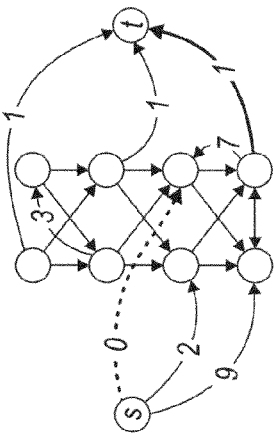
Figure 11G:
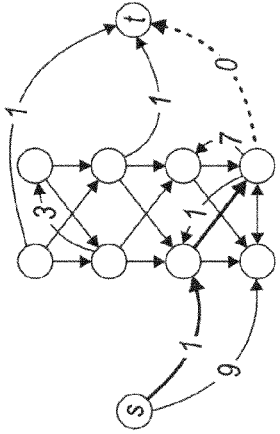
Figure 11H:
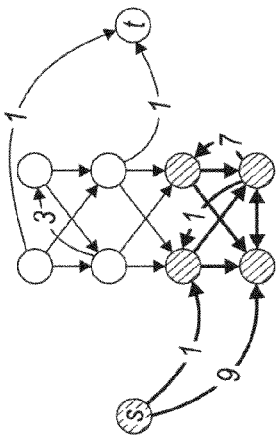

While the graph transforms described above represent one embodiment of the present invention, several algorithms for computing the minimum s-t cut exist. For example, with some algorithms, the start vertex is a source and the terminal vertex is a sink. The negative-cost (non-negative-cost) vertices are tunnels allowing water to flow in (out). The edges are pipes connecting the source, tunnels and the sink. The pipes are directional, and the cumulative water flow cannot exceed the pipe capacity. Due to the limited pipe capacities, the amount of water that can flow from the source to the sink will have some maximum. To achieve this maximum flow, some pipes will be saturated, meaning that the water flowing through them will equal their capacities. In FIG. 11(e), the path from s to t was found with a capacity of 3. This will saturate the path's pipes (edges) from the source and to the sink. These two saturated pipes are removed and a new pipe is created in the reverse direction along the path having a capacity of 3. In FIG. 11(f), another s-t path is found with a capacity of 7. Similarly, a reverse path with capacity of 7 is created. FIG. 11(g) identifies the third and final path that can be found—its capacity of 1 saturates the pipe to the sink that was not completely saturated in the previous step. Since this was the last path, all tunnels that can be reached from the source are identified (FIG. 11(h)) as belonging to the minimum cost closed set (FIG. 11(i)). The uppermost vertices of the minimum closed set form the minimum cost path thus determining the solution.

2. Example 2: 3-D Surface Detection

Figure 12A:
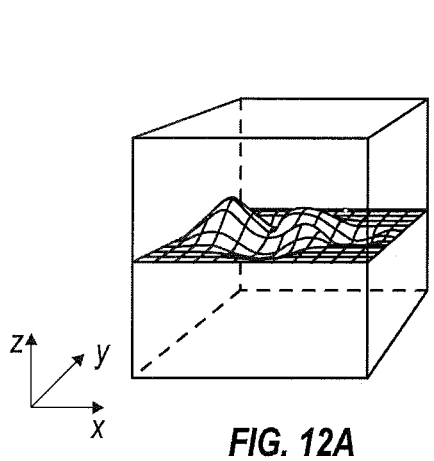
FIG. 12 shows various examples of optimal surface detection models according to the present invention.

Consider the task of detecting a terrain-like surface representing the boundary of a 3-D object in a volumetric image I(x,y,z) (briefly, I). Let X, Y, and Z be the image sizes in x, y, and z dimensions, respectively. I(x, y, z) is used to denote the voxel at the spatial position (x, y, z) in the image I. For each (x, y) pair with $0 \le x \le X$ and $0 \le y \le Y$, the voxel subset $\{I(x, y, z): 0 \le z \le Z\}$—which forms a column parallel to the z-axis—is called the (x, y)-column of I, denoted by Col(x, y). Two (x, y)-columns are adjacent if their (x, y) coordinates satisfy some neighborhood conditions. For instance, under the 4-neighbor setting, the column Col(x, y) is adjacent to Col(x+1, y), Col(x−1, y), Col(x, y+1), and Col(x, y−1). Therefore, a model of the 4-neighbor adjacency is used, called the base model or base graph (this simple model can be easily extended to other adjacency settings). Without loss of generality ("WLOG"), that the sought surface S is assumed to be so oriented that it spreads over the x and y dimensions (FIG. 12(a)), and it intersects with each (x, y)-column at one and only one voxel. Mathematically, the surface S is called an xy-monotone surface and can be defined by a function S: $\{0, 1, \ldots, X-1\} \times \{0, 1, \ldots, Y-1\} \to \{0, 1, \ldots, Z-1\}$.

FIG. 12 depicts modeling of the optimal surface detection problem. The surface orientation is shown at FIG. 12(a). Three adjacent columns in the constructed graph are shown at FIG. 12(b), with smoothness parameters $\Delta_x=2$ and $\Delta_y=1$. A tubular object in a volumetric image is shown at FIG. 12(c). FIG. 12(d) shows the "unfolding" of the tubular object in (c) to form a new 3-D image. The boundary of the tubular object in the original image corresponds to a surface to be detected in the unfolded image. FIG. 12(e) illustrates the 3-D polar transformation.

Figure 12B:
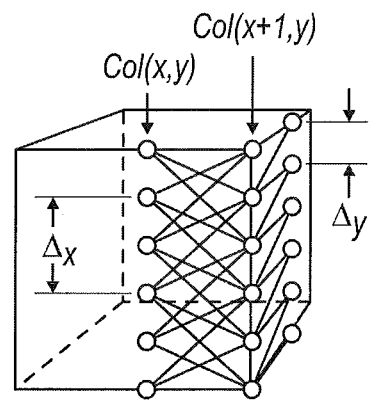
Figure 12C:
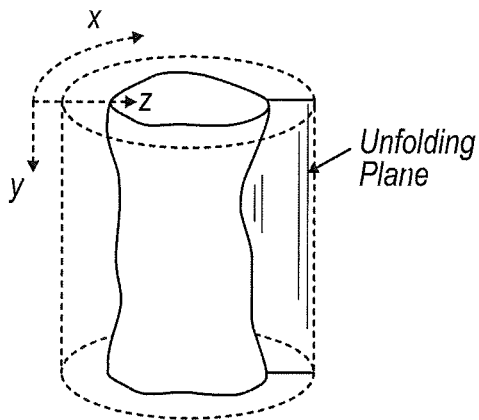
Figure 12D:
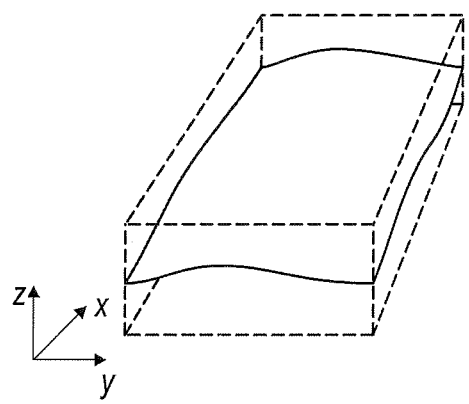

Since many anatomical structures are smooth, one may expect the detected surfaces to be sufficiently "smooth". The smoothness constraints ensure the surface continuity in 3-D. Specifically, two smoothness parameters, $\Delta_x$ and $\Delta_y$, are used to specify the maximum allowed change in the z-coordinate of a feasible surface along each unit distance change in the x and y dimensions, respectively. That is, if I(x, y, z') and I(x+1, y, z") are two voxels on a feasible surface, then $|z'-z''| \leq \Delta_x$; if I(x, y, z') and I(x, y+1, z") are two voxels on a feasible surface, then $|z'-z''| \leq \Delta_y$. FIG. 12b illustrates the smoothness constraints. If $\Delta_x$ ($\Delta_y$) is small, the feasible surface is "stiff" along the x(y) dimension, and the stiffness decreases with larger values of $\Delta_x$ ($\Delta_y$).

A cost value c(x, y, z) can be computed and associated with each voxel I(x, y, z) in I, by setting an application-specific cost-function. Generally, the cost value is inversely related to the likelihood that the desired surface would contain the corresponding voxel. The cost of a feasible surface is the total cost of all voxels on that surface.

Embodiments in accordance with the present invention are also directed to finding an optimal surface in I, which is the one with the minimum cost among all feasible surfaces that can be defined in I. The presently inventive methods solve the optimal surface detection problem by formulating it as computing a minimum-cost closed set in a directed graph. A closed set C in a directed vertex-weighted graph is a subset of vertices such that all successors of any vertex in C are also contained in C. The cost of a closed set C is the total cost of the vertices in C. Note that a closed set C can be empty (with a zero cost).

The construction of the directed graph G=(V, E) for modeling I, which is elegant and nontrivial, is derived from the following observation. For every voxel I(x, y, z) and each its adjacent column Col(x', y'), the lower eligible neighboring voxel of I(x, y, z) on Col(x', y') is the voxel on Col(x', y') with the smallest z-coordinate that can appear together with I(x, y, z) on the same feasible surface in I. FIG. 11(a) shows an image consisting of only two columns of voxels (a 2-D image is used for better readability). The value in each circle is the cost of the voxel. The smoothness parameter $\Delta_x=1$ in this example. Thus, voxel g is a lower eligible neighboring voxel of band voxel c is a lower eligible neighboring voxel of f. A voxel I(x, y, z) is generally above (resp., below) a surface S if S(x, y)<z (resp., S(x, y)>z), and denoted by L$\omega$(S) all the voxels of I that are on or below S. For any feasible surface S in I, the lower eligible neighboring voxels of every voxel in L$\omega$(S) are also contained in L$\omega$(S). Instead of searching for an optimal surface S* directly, the presently inventive method looks for a voxel set L$\omega$(S*) in I, which uniquely defines the surface S*.

The directed graph G is constructed from I, as follows. Every vertex V(x, y, z)$\in$V represents one and only one voxel I(x, y, z)$\in$I. Thus, G may be viewed as a geometric graph defined on a 3-D grid. The edges of G are introduced to guarantee the following: (1) For any feasible surface S, the set of vertices corresponding to the voxels in L$\omega$(S) is a non-empty closed set C in G; (2) any non-empty closed set C in G specifies a feasible surface S in I. First, validation that if voxel I(x, y, $z_s$) is on S, then all the vertices V(x, y, z) of G below V(x, y, $z_s$) (with $z \leq z_s$) on the same column must be in the closed set C must occur. Thus, for each column Col(x, y), every vertex V(x, y, z) (z>0) has a directed edge to the vertex V(x, y, z−1) (FIG. 11b). Next, G must incorporate the smoothness constraints along the x- and y-dimensions. Notice that if voxel I(x, y, $z_s$) is on surface S, then its neighboring voxels on S along the x-dimension, I(x+1, y, z') and I(x−1, y, z"), must be no "lower" than voxel I(x, y, $z_s-\Delta_x$), i.e., Z', $Z'' \geq z_s-\Delta_x$. Hence, vertex V(x, y, $z_s$)$\in$C indicates that vertices V(x+1, y, $z_s-\Delta_x$) and V(x−1, y, $z_s-\Delta_x$) must be in C. Thus, for each vertex V(x, y, z), the directed edges from V(x, y, z) to V(x+1, y, $z-\Delta_x$) and to V(x−1, y, $z-b\cdot x$), respectively. Note that vertex V(x+1, y, $z-\Delta_x$) (resp., V(x−1, y, $z-\Delta_x$)) corresponds to the lower eligible neighboring voxel of voxel I(x, y, z) on its adjacent column Col(x+1, y) (resp., Col(x−1, y)). FIG. 11(b) shows the edges introduced between two adjacent columns to enforce the smoothness constraints. The same construction is done for the y-dimension. Next, a vertex cost $\omega$(x, y, z) is assigned to each vertex V(x, y, z) in G, as follows.

$$\omega(x, y, z) = \begin{cases} c(x, y, z) & \text{if } z = 0 \\ c(x, y, z) - c(x, y, z-1) & \text{if } z > 0 \end{cases}$$

where c(x, y, z) is the cost of voxel I(x, y, z). FIG. 11(c) depicts the vertex cost assignment scheme. The value in each circle shows the cost of the vertex.

Analysis reveals that (1) any non-empty closed set C in G defines a feasible surface S in/with the same cost, and (2) any feasible surface S in I corresponds to a non-empty closed set C in G with the same cost. Thus, a minimum-cost closed set C* can be used to specify an optimal surface S* in I.

A minimum-cost closed set C* in G can be obtained by formulating it as computing a minimum s-t cut in a transformed graph $G_{st}$ with O(n) vertices and O(n) edges. Thus, by using Goldberg and Tarjan's algorithm, C* in O($n^2$ log n) time can be computed. If the cost of each voxel in I can be represented by log U bits, then the time complexity can be further improved to O($n^{1.5}$ log n log nU) by applying Goldberg and Rao's maximum flow algorithm.

Figure 11I:
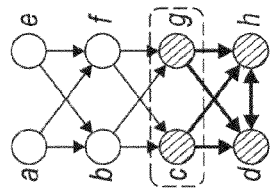

Finally, the optimal surface S* in I can be recovered from C* by computing the upper envelope of I(C*), where I(C*) is the set of voxels of/corresponding to the vertices in C*. For every $0 \leq x \leq X$ and $0 \leq y \leq Y$, let B(x, y)=I(C*)$\cap$Col(x, y). Then the voxel I(x, y, z*) in B(x, y) with the largest z-coordinate is on the optimal surface S*. In this way, the minimum closed set C* of G specifies an optimal surface in I. In FIG. 11i, the four filled vertices V(c), V(d), V(g), and V(h) form a minimum-cost non-empty closed set in G. Voxels c and g are on the upper envelope of the voxel set {c, d, g, h}. Hence, c and g are on the optimal surface.

3. Example 3: Cylindrical/Tubular Surfaces

The principles from Example 2 are also applicable to detecting cylindrical/tubular surfaces, since such surfaces can always be invertibly "unfolded" to terrain-like surfaces using the cylindrical coordinate transform. Due to the circularity of a cylindrical surface, the edges of the corresponding graph should be connected in a circular manner to ensure the closure of the result. For instance, suppose an image is unfolded along the x-direction (see FIGS. 12(c) and (d)), then the smoothness constraint is also needed between the graph columns at (0,y,z) and (X−1, y, z), with y$\in$\{0, . . . , Y−1\} and z$\in$\{0, . . . , Z−1\}.

4. Example 4: Spherical/Closed Surfaces

Figure 12E:
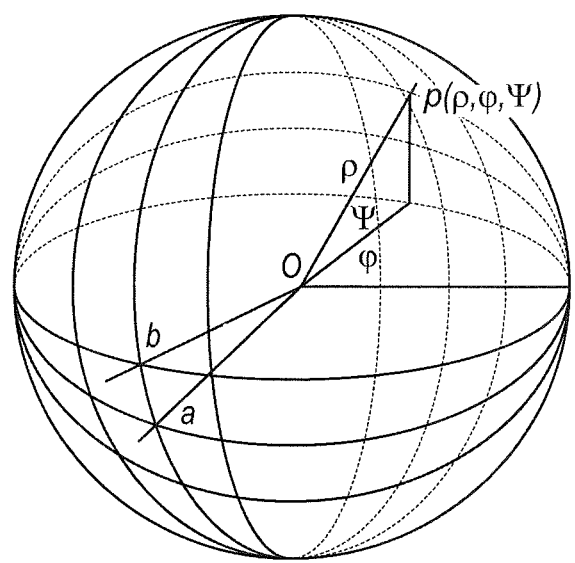

Spherical-like structures are ubiquitous in medical image data, such as livers, kidneys, left ventricles, and cells. One embodiment of the present invention addresses these structures. Start with an assumption of an approximate centroid 0 of the target object. A 3-D polar transformation is performed on the input image T. Consider a unit sphere R centered at O (see FIG. 12(e)). For each selected point p(1, $\phi$, $\psi$) on the unit sphere R, resampling is performed in the image T along the ray $\vec{op}$. The resampled voxels on $\vec{Op}$ form a column Col(p) in the resulting unfolded 3-D image I. Next, define a spherical grid (called embedded grid) on the surface of the unit sphere R which, for example, consists of a set of great circles of R as illustrated in FIG. 12e. Then establish the smoothness constraints between any two neighboring columns, $Col(p_1)$ and $Col(p_2)$, in the unfolded image I if $p_1$ and $p_2$ are adjacent on the embedded grid.

If the target object in T is distorted too much from a sphere, the (regular) embedded grid may not well capture the fine details of the object boundary. Fortunately, in most cases, a preliminary surface that well approximates the structure of the boundary can still be obtained. As part of the object localization stage, approximate surface detection methods are frequently available, e.g., using active appearance models, level sets, atlas-based registration, and other similar approaches. Each voxel on the preliminary surface can be viewed as a sample point. Since the point sampling is "dense" enough, the topology of the underlying smooth surface can be restored correctly by using the 3-D Voronoi diagram and Delaunay triangulation. Thus, a triangulation $\Delta$ for the preliminary surface is computed, which captures the topological structure of the underlying boundary surface. Using this triangulation $\Delta$, the input image T, can be "unfolded" as follows. For each vertex p of the triangulation $\Delta$ (p is voxel on preliminary surface), a resampling in T is conducted along the normal of the preliminary surface at p, forming a column Col(p) of voxels in the resulting 3-D unfolded image I. Then, for any two adjacent vertices $p_1$ and $p_2$ of the triangulation $\Delta$, the smoothness constraints between $Col(p_1)$ and $Col(p_2)$ are enforced in the unfolded image I. In this way, the surface detection algorithm is able to be extended to the segmentation of spherical objects.

In addition to homogeneous smoothness constraints, which remain constant along each dimension, the above approach allows variable geometric constraints, which can be image context-dependent. This flexibility has practical implications since the surface smoothness may vary at different locations by rearranging the graph edges. Although the variable constraints can be input by a user, it is tedious and time-consuming.

5. Example 5: Multiple Surface Detection Method

In medical images, many surfaces that need to be identified appear in mutual interactions. A number of medical imaging problems can benefit from an efficient method for simultaneous detection of multiple interacting 3-D surfaces. However, the problem of simultaneous detection of interrelated surfaces, especially when the number of surfaces is larger than two, is such an under-explored problem that few existing methods formally address it.

One embodiment of the present invention generalizes a net surface model to the simultaneous detection of k>1 interrelated surfaces in a 3-D image I such that the total cost of the k surfaces is minimized. An embodiment of the method of the present invention is directed toward ensuring the global optimality of the solution. In simultaneously detecting multiple distinct but interrelated surfaces, the optimality is not only determined by the inherent costs and smoothness properties of the individual surfaces, but also is confined by their interrelations. For each pair of the sought surfaces, relations are specified using two parameters, $\delta^l \geq 0$ and $\delta^u \geq 0$, representing the surface separation constraints. The pairwise relations thus modeled are the minimum and/or maximum distance, and the relative positioning of the two surfaces, i.e., whether one surface is above or below the other. In many practical problems, the sought surfaces are not expected to intersect or overlap. For instance, the inner and outer tissue borders should be non-crossing, and the distance between them should be within some expected range in medical images.

Computing each of the k surfaces individually using above described techniques is not optimal, since it might give a solution to the multiple surface detection problem with a local minimum cost, which may be far away from the global minimum. Moreover, the solution thus obtained might even be infeasible, either violating the surface separation constraints or containing less than k surfaces. Hence, a new method for computing k>1 optimal surfaces is required. In one embodiment of the present invention, the method simultaneously identifies k optimal mutually interacting surfaces as a whole, by computing a minimum closed set. The construction of the graph is derived from new observations on the surface positioning, which help enforce the surface separation constraints.

The directed graph G=(V, E) constructed from/contains k disjoint subgraphs $\{G_i=(V_i, E_i): i=1, 2, \ldots, k\}$, such that each $G_i$ is constructed in the same manner as presented above and is used for searching the i-th surface $S_i$. The separation constraints between any two surfaces $S_i$ and $S_j$ are enforced in G by a set of edges $E_s$, connecting the corresponding subgraphs $G_i$ and $G_j$. Thus, $V = \cup_{i=1}^{k} V_i$ and $E = \cup_{i=1}^{k} E_i \cup E_s$. In other words, detecting k optimal surfaces in d-D is mapped to the problem of finding a single optimal solution in (d+1)-D. Below, simultaneous detection of two surfaces is used in I to exemplify embodiments of the present invention for the construction of $E_s$.

Figure 13A:
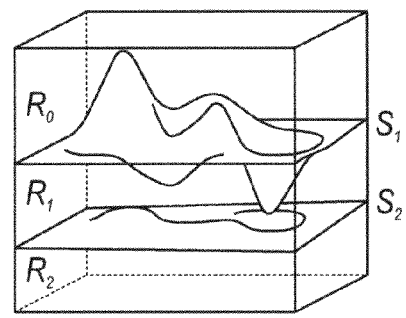
FIG. 13 shows modeling examples for the simultaneous detection of two surfaces according to the present invention.
Figure 13B:
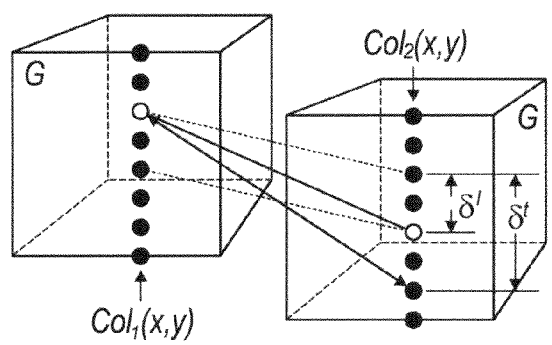

Suppose for the two sought surfaces $S_1$ and $S_2$, the prior knowledge puts $S_2$ below $S_1$ as shown in FIG. 13(a). Let the minimum distance JI between them be 2 voxel units and the maximum distance $\delta^u$ be 5 voxel units (FIG. 13(b)). For convenience, denote by $Col_i(x, y)$ the column of vertices in $G_i$ corresponding to the column Col(x, y) of voxels in I (i=1, 2). The separation constraints between $S_1$ and $S_2$ are incorporated into G in the following way. For each vertex $V_2(x, y, z) \in Col_2(x, y)$ with $z < Z - \delta^l$, as illustrated in FIG. 13(b), a directed edge is put in $E_s$ from $V_2(x, y, z)$ to $V_1(x, y, z+\delta^l) \in Col_1(x, y)$ in $G_1$. This ensures that if voxel I(x, y, z) lies on surface $S_2$, then the voxel I(x, y, z') $\in Col(x, y)$ on $S_1$ must be no "lower" than voxel I(x, y, z+$\delta^l$) (i.e., z'$\geq$z+$\delta^l$). On the other hand, each vertex $V_1(x, y, z) \in Col_1(x, y)$ with $z \geq \delta^l$ has a directed edge in $E_s$ to $V_2(x, y, z') \in Col_2(x, y)$ with z'=max{0, z-$\delta^u$} (FIG. 13b), making sure that if I(x, y, z) $\in$ Col(x, y) is on $S_1$, then the voxel of Col(x, y) on $S_2$ must be no lower than voxel I(x, y, z'). This construction is applied to every pair of the corresponding columns of $G_1$ and $G_2$. Thus, the separation constraints are incorporated into G. Note that, due to the separation constraints, some voxels may never appear on a certain surface. By exploiting the intrinsic geometric properties, a nontrivial linear-time scheme in accordance with embodiments of the present invention to remove such "useless" vertices from the corresponding subgraph is employed.

Figure 13C:
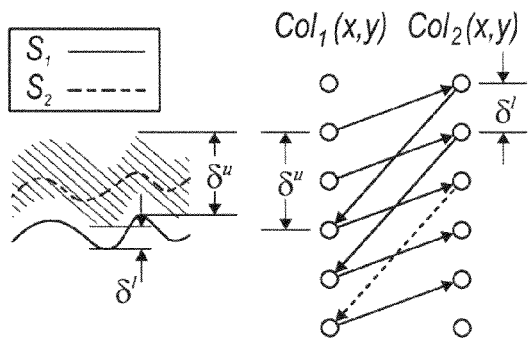
Figure 13D:
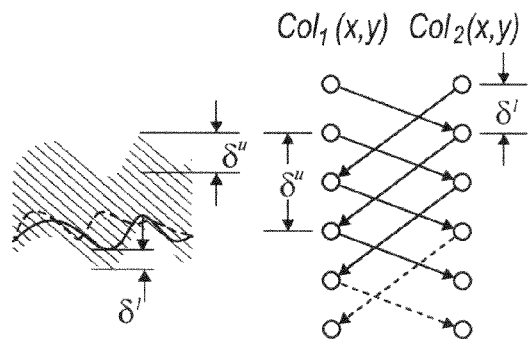
Figure 14A:
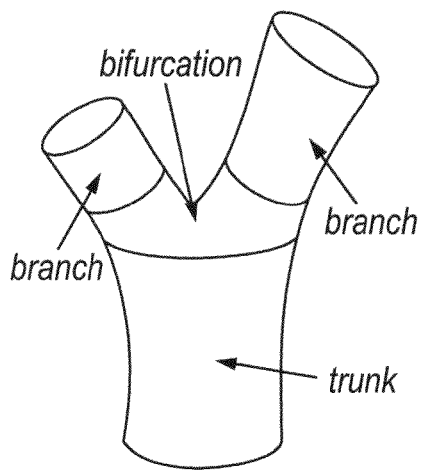
FIG. 14 shows pre-segmentation and generating of a triangulated mesh according to the present invention.
Figure 14B:
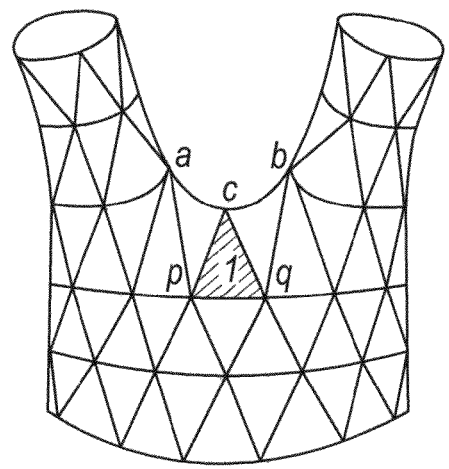
Figure 14C:
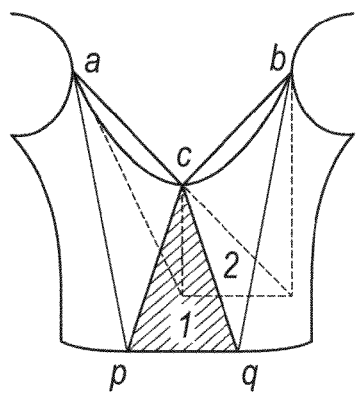
Figure 14D:
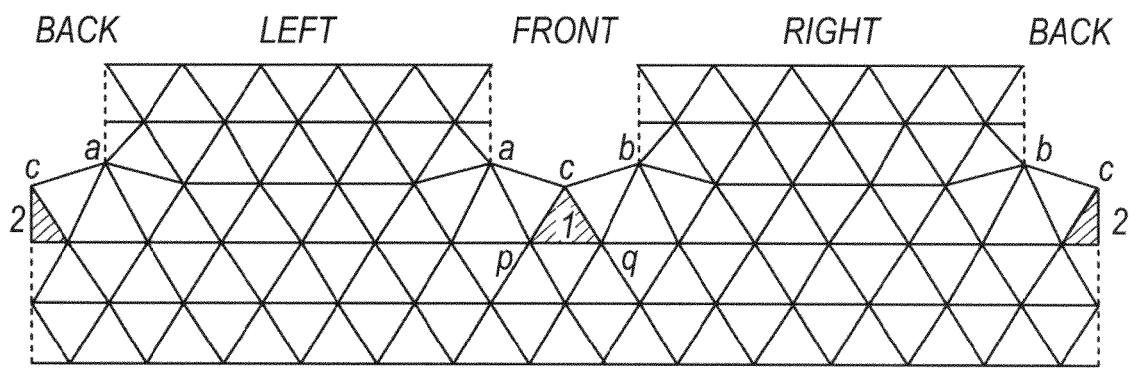

FIG. 13(a) illustrates multiple surfaces in a 3-D image. FIG. 13(b) models the relations between two surfaces. $G_1$ and $G_2$ are the 3-D graphs dedicated to the search of the two surfaces, $S_1$ and $S_2$. A summary of the modeling of non-crossing and crossing surface interrelations is shown at FIGS. 13(c) and 13(d). $Col_1(x, y)$ and $Col_2(x, y)$ are two corresponding columns in the 3-D graphs. Dashed edges are optional.

When more than two surfaces shall be detected, their interactions can be specified by modeling their pairwise relations. The modeling of non-crossing and crossing surface interrelations is presented in FIG. 13(c), (d).

From the construction of graph G, the following is shown: Any feasible k surfaces in I correspond to a non-empty closed set in G with the same total cost and any non-empty closed set in G defines feasible k surfaces in/with the same total cost.

Hence, any k surfaces $\{S_i^*: i=1, 2, \ldots, k\}$ corresponding to a minimum-cost closed set $C^* \neq \emptyset$ in G are k optimal surfaces in I. Note that |V|=O(kn) and |E|=O(kn). Thus, a minimum-cost closed set C* in G can be computed in $O(k^2n^2 \log kn)$ time using Goldberg and Tarjan's s-t cut algorithm. Next, the optimal k surfaces is defined $\{S_1^*, S_2^*, S_k^*\}$ in/from C*. Recall that each surface $S_i^*$ in the sub graph $G_i=(V_i, E_i)$ is detected. Let $C_i^*=C^* \cap V_i$. Then, $S_i^*$ can be obtained by computing the upper envelope of $I(C_i^*)$, where $I(C_i^*)$ is the set of voxels in/corresponding to the vertices of $G_i$ in $C_i^*$.

6. Example 6: Multiple Spherical Surfaces

Simultaneous detection of multiple interacting surfaces for a spherical structure is a frequent task in medical imaging (e.g., simultaneous detection of endocardium and epicardium in a left ventricle). Combined with the unfolding scheme described herein, the above principles are also applicable to identifying multiple spherical surfaces concurrently. However, if the structures of the neighboring surfaces of the spherical object are quite different, more caution is needed to enforce the surface separation constraints. For example, let $\Delta_1$ and $\Delta_2$ be the triangulations of any two neighboring preliminary surfaces. Note that the unfolding is performed along the normal of a triangulation at each its vertex. Let the normal at a vertex $q \in \Delta_2$ intersect a triangle $\Delta p_0 p_1 p_2$ of the triangulation $\Delta_1$. Then, the surface separation constraints between the columns $Col(q)$ and $Col(p_i)$ (i=0, 1, 2) is enforced in the unfolded image.

7. Example 7: Surface Detection Allowing Topology Changes

The net surface models work well for optimal single- and multiple-surface detections in 3-D/4-D medical images when the target objects have a relatively simple or "invariant" topology such as a tubular path. However, many medical objects have much more complex topologies. Thus, incorporating the topological adaptability into the present invention is important to handling objects whose topologies may vary flexibly.

Complex objects, for the purposes of the present invention, are objects which can preferably be partitioned in sub-objects. For example, tree-like objects that can be separated in individual branches, objects that can be described as multiplicity of inter-related adjacent components, and similar.

Naturally, a good quality segmentation of objects with a specific topology should faithfully preserve the known topology of the objects. A generalization of the net surface models can be implemented for solving the problem of detecting surfaces for objects with known complex topologies in 3-D/4-D images. Segmentation of the human airway tree in the pulmonary CT image can be used to exemplify embodiments of the present invention. Note that embodiments of the methods of the present invention are not limited to the tubular and tree-like structure described, rather, embodiments of the methods are in general applicable to any shape for which a triangulation $\Delta$ can be generated. Previous approaches are directed to identifying the boundary surface in the re-sampled image separately for each individual airway segment, and then somehow "glue" the resulting segment surfaces together to form a segmented airway tree. Inherent drawbacks of such approaches are the lack of contextual segment-to-segment information and optimality. Clearly, to obtain a more coherent and optimal segmentation, performing detection directly on the airway tree as a whole is more desirable.

First, the entire airway tree from the pulmonary CT image is pre-segmented by using a multi-seed fuzzy connectedness technique, as would be understood by those having ordinary skill in the art. This pre-segmentation step gives approximate spatial locations and topologies of the trunk and branches of the airway tree. Accurate positioning of the airway tree boundary, however, is not guaranteed. Next, an approximate surface for the airway tree boundary is generated. Note that the portion of the approximate surface for each airway segment (i.e., the trunk and branches) can be found relatively easily, since its topology is simple (i.e., a tubular path). But, the portion of the approximate surface for a furcation (i.e., the part where the trunk and branches meet) of the airway tree can have a quite complicated local structure, and thus it is a difficult task for the approximate surface to capture a sufficient level of details of such a furcation. This can be addressed by using computational geometry ideas and techniques. As discussed for closed surfaces, the topology of an underlying smooth surface can be reconstructed using Delaunay triangulation, provided the sampling is "dense" enough. Thus, a triangulated mesh $\Delta$ is produced for the approximate surface; which is expected to be topologically faithful to the boundary of the target airway tree. FIG. 13(a) depicts a pre-segmented boundary surface of one bifurcation part of an airway tree. A schematic representation of the triangulated mesh of the boundary surface is shown in FIG. 13(b). In this case, 6 triangles are used to approximate the bifurcation as demonstrated in FIG. 13(c), while the bifurcation can certainly be more complex.

FIG. 13(a) shows the approximate surface of an airway branch in 3-D. Triangulation of the trunk and the branches in a frontal view, triangle "1" ("cpq") is modeling the actual branch point is shown at FIG. 13(b). Triangle 1 in FIG. 13(c) is modeling the front part while triangle 2 ("cpq") is modeling the back part of the branch, both meeting at c; adjacent triangles acp1 and bcq1 have their respective counterparts acp2 and bcq2 on the back side. Transformation of $\Delta$ into the planar domain, at FIG. 13(d), uniquely creating nodes and vertices for the graph; note that for nodes a, b, and c, connecting vertices are wrapped around the graph and replicated here only to increase readability.

After obtaining the triangulated mesh $\Delta$, a resampling in the input image T is performed. For every vertex v on the mesh $\Delta$, the resampling is done along a ray intersecting v in the direction of the normal of the meshed surface $\Delta$ at v, yielding a column (vector) Col(v) of voxels. As the result of this resampling, a set of columns of voxels is established, which form a single new image I. The adjacency relations among the voxel columns in the resulting image I (i.e., the neighborhood setting of I) are uniquely specified by edges on the triangulated mesh A. In order to embed the triangulated 3-D surface ¢ shown in FIG. 13(b) into a 2-D planar structure, it needs to be cut along three lines. Note that this step is only necessary to represent the 3-D structure in 2-D for better intuition and is not a prerequisite for methods in accordance with the present invention. As shown in FIG. 13(d), the branches are cut along the polylines defined by the points a and b on the inner side of the branches. The trunk is cut on the back along a polyline starting at point c, i.e., also cutting the triangle 2 on the back. This process not only "replicates" points a, b, and c, but also the connecting edges ac and bc. Imagine that for each vertex v of $\Delta$, the associated column Col(v) of voxels obtained from the resampling is "put" on v in FIG. 13(d) (Col(v) is perpendicular to the plane), thus giving an intuitive view of I. Further, the smoothness constraints need to be satisfied between any two adjacent columns specified by the triangulated mesh $\Delta$. A feasible surface S "intersects" each column of I at exactly one voxel and satisfies the smoothness constraints. Note that for columns Col(a), Col(b), and Col(c), S intersects them at the respective voxels representing a, b, and c. Thus, any feasible surface in I, if wrapped around for both the trunk and two branches, gives a feasible boundary surface of the airway tree.

A vertex-weighted directed graph G is then built based on the voxel columns in the image I. Information on the smoothness constraints and surface separation constraints for the target airway tree boundary needs to be obtained (these constraints are enforced by the edges of G).

Such information can be determined based on the local features, such as curvatures, of each vertex on the triangulated mesh Δ and/or may also be determined by a priori knowledge of the target object. The assignment of vertex weights in G can be accomplished as discussed herein.

After the graph G is constructed, an optimal segmentation of the target airway tree boundary contained in G can be obtained by using the graph search method, discussed herein. Note that although the structure of the mesh Δ, and thus the adjacency relations among the vertex columns of G, can be quite irregular, the applicability and optimality of the graph search method are not affected at all (since it simply computes an optimal non-empty closed set in G, regardless of the structure of G).

Several issues can affect the results. In practice, sometimes it may not be easy to ensure that the sampling is "dense" enough to detect the correct surface topology (e.g., on high curvature surface regions). The AAM based approach above, together with Dey and Giesen's computational geometry algorithm for dealing with undersampling, may be applied to help identify such problematic regions and determine the necessary density of sampling. Another issue is to ensure that the output airway tree boundary has no undesired self-intersections. This can be done by choosing an appropriate length for each vector of voxels in the image resampling step, such that the voxels of the vectors in the resampled image I all come from disjoint portions of the input image T. How to choose an optimal length for each voxel vector in the resampling is a non-trivial issue. One way to handle this issue is to determine the vector lengths by using a priori knowledge made available by AAM model based approaches. Another way is, in a spirit similar to level set approaches, to first choose a length for each voxel vector conservatively (i.e., ensuring no unwanted self-intersections in the resulting boundary), compute an optimal boundary contained in the graph G, and then use the resulting boundary surface as the mesh to repeat the above proposed algorithm in an iterative fashion, until a satisfactory solution is achieved.

8. Example 8: Incorporating a Priori Knowledge in Optimal Surface Detection

To achieve accurate and efficient segmentation of 3-D/4-D medical images, certain embodiments in accordance with the present invention utilize as much as possible a priori knowledge about the target objects, such as the image appearance, anatomical and pathological shape variations, and observer preference. However, most existing methods do not incorporate sufficient a priori knowledge on the target segmentation problems; even rarer attempts are known on making good use of a priori shape knowledge in segmenting medical images in 3-D and 4-D.

The AAMs, introduced by Cootes et al., utilize a priori knowledge. However, most AAM approaches are only given for 2-D segmentation, and few are known to truly work for 3-D medical images. These AAM approaches have several drawbacks: they cannot guarantee the optimality of the segmentation results (the output may converge to a local optimum which can be arbitrarily far away from the globally optimal solution); the segmentation does not handle local features and border information well, and is somewhat biased towards the average model used; and it is difficult to extend the AAM approaches to 4-D due to the high computational cost incurred.

Thus, embodiments of the present invention provide new approaches for incorporating a priori knowledge in segmenting 3-D/4-D medical images. These new approaches are based on a careful combination of the AAM approaches and the net surface network model. Comparing with previous segmentation approaches that utilize a priori knowledge, the present invention has several advantages, including: (1) capturing specified local features of the target objects, (2) compatibility for 3-D images, (3) extension to 4-D, and (4) global optimality by fast computation.

A priori knowledge on a target object can be obtained from either the preference specified by an observer or a "prototype model" (e.g., the AAM approaches generate an "average model" and its shape variations by learning a set of training shape examples). A priori knowledge can be local (e.g., information on the surface features around some landmark points) or global (e.g., the expected shape and properties of the target object such as its convexity or monotonicity, and the shape variations of the AAMs). The approaches in accordance with the present invention are expected to work well with various a priori knowledge settings.

E. Incorporating Local Features

Local features may specify the local connections of a possible surface voxel I(x, y, z) with its neighboring surface voxels, such as the local smoothness of the sought surface between I(x, y, z) and each of its neighboring surface voxels. Local features may also include the range of separation distance between a voxel possibly on one surface and the corresponding voxel possibly on another interrelated surface. That is, different pairs of neighboring voxels on one surface may have different smoothness constraint parameters, and different pairs of corresponding voxels, possibly on two interrelated surfaces, may have different separation constraint parameters. Note that the approaches in accordance with the present invention for detecting a single optimal surface or multiple optimal interrelated surfaces in 3-D/4-D medical images use global smoothness constraints and global surface separation constraints. However, these approaches can be extended to accommodating the above local features. The resulting graph preserves all properties required by the same polynomial time algorithm to compute a guaranteed minimum closed set in the graph (and thus an optimal segmentation). For example, to add edges between two x-adjacent columns Col(x, y) and Col(x+1, y) in a graph G, instead of using the global x-smoothness parameter $\Delta_x$, a smoothness parameter $\Delta(x, x+1, y)$ issued specifically for edges between columns Col(x, y) and Col(x+1, y) is used. The rest of the computation remains the same.

The 3-D approach in accordance with the present invention combines the AAM framework and the net surface network model. There are two main tasks to consider: (1) building a 3-D AAM based net surface network model to capture a priori knowledge on the target object shapes, and (2) detecting surfaces from an input 3-D image.

The 3-D AAM based net surface network model consists of an AAM model and a base graph $G_B$. The base graph $G_B$ defines the set of columns in the net surface network model and the adjacency relations among the columns: each vertex in $G_B$ corresponds to exactly one column and each edge of $G_B$ specifies two adjacent columns. (It should be noted that the main base model (i.e., base graph) is assumed (for simplicity) to be a regular 2-D 4-neighbor grid.) However, the net surface approaches actually allow the base graph (which defines the adjacency relations among the columns) to be an arbitrary graph. In this section, the base graph $G_B$ has a somewhat irregular structure that depends on the target surfaces.

An AAM is first constructed of the target 3-D object shapes. From the surfaces of the average shape model, a triangulation is created on each such surface (e.g., the Delaunay triangulation of the vertices and other selected points on the surface). Around the regions of each model surface where complex topologies are expected (e.g., surface branches) or delicate surface features, more sample points are used in the triangulation to capture the detailed local features of the surface. This triangulation can be obtained by computational geometry algorithms. If the AAM has only one target surface, then this triangulation defines base graph $G_B$: The vertices and edges of the triangulation are the vertices and edges of $G_B$, respectively. If there are multiple interacting surfaces to detect, the situation is more complicated due to the necessary correspondence among the multiple surface triangulations. For each vertex of the triangulation on every surface, its corresponding points are located on the triangulations of the interrelated surfaces based on the AAM, and add such points onto those triangulations. Then, triangulate each triangular face of every triangulation is triangulated again (due to the added points), maintaining the correspondence across the interrelated triangulations on the target surfaces between their vertices and edges (special care is needed to ensure the edge correspondence). After this re-triangulation process, each vertex and edge of every surface triangulation correspond to exactly one vertex and edge on every interrelated triangulation, respectively. Then, each set of correspondence vertices of the interrelated triangulations defines exactly one vertex in the base graph $G_B$, and each set of correspondence edges of these triangulations specifies exactly one edge in $G_B$.

Using the average model and the training shape examples, also generated in an automated fashion, are the local smoothness constraint values and surface separation constraint values. For example, from the curvature around a vertex v of a triangulated surface, the local smoothness parameters can be determined between the column associated with v and the columns associated with the adjacent vertices of v on the triangulated surface.

As for the second task, to detect surfaces in a target 3-D image T, the AAM average model is positioned in T for a best possible initial matching of the sought objects. Next, the set of columns is created on which a vertex-weighted directed graph G is defined (segmentation in T is carried out by computing a minimum closed set in G). Each such column is associated with exactly one vertex of the base graph $G_B$, and contains resampled information of the target image T. WLOG, let a vertex v of $G_B$ represent a sequence of correspondence vertices $(v_1, v_2, v_k)$ of the triangulations on k interrelated surfaces, where $v_1$ ($v_k$) is on the top (bottom) most surface. For $v_1$ ($v_k$), resampling in T is performed along the ray starting at $v_1$ ($v_k$) and going upwards (downwards) in the direction normal to the top (bottom) surface at $v_1$ ($v_k$). For every pair of $v_i$ and $v_i+1$, i=1, 2, ..., k−1, resampling occurs in T along the line segment $\overline{v_i v_{i+1}}$. If the topologies of the target surfaces are complicated (e.g., non-spherical), however, care must be taken to ensure that the resampled voxel information in different columns does not overlap.

After the set of columns (containing resampled voxel information in T) is obtained, the vertex-weighted directed graph G is built on these columns, using the local smoothness constraint and surface separation constraint information made available in solving task (1). G is the net surface network model for the sought surfaces in the image T. The segmentation in T is then done optimally by finding a minimum closed set in G.

In the 3-D AAM framework, a gradient descent method is used to generate an improved matching between the target objects in T and the appearance model, by repeatedly modifying its affine transformation, global intensity parameters, and appearance coefficients in a random fashion. Embodiments of the present invention, as described above, can be used effectively as a key procedure in this gradient descent optimization. That is, for each random perturbation of the model parameters, a set of optimal interrelated surfaces in T is computed by solving the second task with respect to the perturbed appearance model. This process is repeated until the result cannot be improved any further. Alternatively, the normal AAM gradient descent method can be applied to produce a converged segmentation of the sought surfaces in T, and then solve the second task based on the resulting model parameters to finalize and optimize the surface segmentation in T. The same approach applies to other, such as the first task, methods, e.g., when using an atlas-based a priori shape or a level-set localization.

1. Utilizing Shape Priors

Segmentation can also make use of known global features or properties of the target surfaces (such as their convexity or monotonicity). Note that the general image segmentation problem with a specified global shape feature is NP-hard, since even the case of optimally identifying a simply connected object (i.e., a simple polygon) in a 2-D image is NP-hard. On the other hand, the net surface model approaches can be extended to optimally detecting in 3-D and 4-D images several quite general classes of regions that satisfy certain convexity and monotonicity constraints. For example, an optimal region enclosed between two 3-D pyramid surfaces defined on the xy-plane such that the projections of the peak voxels of both the pyramids on the xy-plane have a non-empty overlap can be computed by using an extension of the net surface model for detecting multiple interacting surfaces. However, these classes of regions may still be too restrictive to model certain medical structures and organs.

Suppose an AAM average model and its shape variations specify the expected global features of the target surfaces. Then the segmentation proceeds as solving the first and second tasks above. Actually, the problem of detecting one optimal surface in the target image can be viewed as detecting two optimal interacting surfaces in the graph G (with some known local smoothness constraints and surface separation constraints on each voxel possibly on the sought surface), such that one of the two surfaces (i.e., the surface of the average model) is already given. Note that crossing between these two surfaces is allowed. Thus, this problem can be solved by the approaches of the present invention for detecting multiple interacting surfaces with incorporation of known local features. In fact, embodiments of the present invention can be generalized to dealing with the case where the total sum of weights of voxels in the region enclosed between these two surfaces is minimized. The problem of detecting k>1 interacting surfaces with expected global features is solved in a similar manner, by formulating it as detecting 2k interrelated (possibly crossing) surfaces with specified local features (k of these surfaces are already fixed).

2. 4-D Extensions

To generalize the 3-D AAM based net surface network model approaches proposed above to 4-D medical images, the key is to extend the AAM approaches from 3-D to 4-D. Note that it is expected; that the net surface network model approach in accordance with the present invention will work in 4-D (in fact, in any d-D with integer d>0).

F. Design of Cost Functions for Optimal Surface Detection

Designing appropriate cost functions is of paramount importance for any graph-based segmentation method. The cost function usually reflects either a region-based or edge-based property of the surface to be identified.

1. Edge-Based Cost Functions

A typical edge-based cost function aims to accurately position the boundary surface in the volumetric image. Such a cost function may, e.g., utilize a combination of the first and second derivatives of the image intensity function, and may consider the preferred direction of the identified surface. Let the analyzed volumetric image be I(x, y, z). Then, the cost c(x, y, z) assigned to the image voxel I(x, y, z) can be constructed as:

$$c(x,y,z) = -e(x,y,z) \cdot p(\phi(x,y,z)) + q(x,y,z)$$

("Equation 2") where e(x, y, z) is a raw edge response derived from the weighted (o) first and second derivatives of the image, and $\phi(x, y, z)$ denotes the edge orientation at location (x, y, z) that is reflected in the cost function via an orientation penalty $p(\phi(x, y, z))$. A position penalty term $q(x, y, z) > 0$ may be incorporated so that a priori knowledge about the expected border position can be modeled.

Note that while typical edge-based cost functions are of the form $\epsilon(f) = \epsilon_{data}(f) + \epsilon_{smooth}(f)$, the smoothness is a hard constraint and is directly incorporated into the graph properties. The cost function parameters (e.g., p, q, ω) are preferably optimized from the desired boundary surface positioning information in a training set of images.

2. Region Based Cost Functions

Incorporating regional information, which alleviates the sensitivity of the initial model and improves the robustness, is becoming increasingly important in image segmentation.

3. Integration of Edge- and Region-Based Cost Functions

One example of relevance is to detect two interacting surfaces $S_1$ and $S_2$ in the image I (with $S_1$ on top of $S_2$), which divide I into three regions $R_0$, $R_1$, and $R_2$ (FIG. 13(a)). The objective is to obtain $S_1$ and $S_2$ whose energy $\epsilon(S_1, S_2)$, defined below, is minimized. $\epsilon(S_1, S_2)$ has " two components: the boundary energy $\epsilon_{boundary}(S_1, S_2)$ and the region energy $\epsilon_{regions}(S_1, S_2)$. $\epsilon_{boundary}(S_1, S_2)$ is the total cost of all voxels on $S_1$ and $S_2$. $\epsilon_{regions}(S_1, S_2)$ measures the global homogeneity regional properties, which can be modeled using continuous probability density functions. Thus, the region probabilities $Pr_0(.)$, $Pr_1(.)$, and $Pr_2(.)$ that measure the likelihood of a given voxel preserving the expected regional properties of the considered classes ($R_0$, $R_1$, $R_2$) can be assumed. Then, $$\varepsilon_{regions}(S_1, S_2) = \sum_{I(x,y,z) \in R_0} g(Pr_0(I(x, y, z))) + \sum_{I(x,y,z) \in R_1} g(Pr_1(I(x, y, z))) + \sum_{I(x,y,z) \in R_2} g(Pr_2(I(x, y, z))),$$

where g(.) is a positive monotonically decreasing function (e.g., Gaussian).

In one embodiment of the present invention, the net surface network model only considers minimizing the boundary energy. The model is powerful enough to accommodate the region energy as well by the integration of the edge- and region-based cost functions. Let $c_r^i(x, y, z)$ denote the region-based cost assigned to the voxel I(x, y, z), which is used to search for surface $S_i$ (i=1, 2). Based on the structure of the model, for i=1, 2, $$c_r^i(x, y, z) = \sum_{k=0}^{z} [g(Pr_i(I(x, y, k))) - g(Pr_{i-1}(I(x, y, k)))].$$

Let $c_e(x, y, z)$ be the edge-based cost assigned to I(x, y, z). Then, for each voxel I(x, y, z), a cost is assigned $c_i(x, y, z) = c_e(x, y, z) + c_r^i(x, y, z)$, which is used to search for surface $S_i$ (i=1, 2). With this integrated cost function, the net surface network model detects optimal surfaces $S_1$ and $S_2$ in/whose energy $\epsilon(S_1, S_2)$ is minimized. The present invention is extendible to incorporating the region-based information into the simultaneous detection of more than two surfaces, as would be understood by those with ordinary skill in the art.

4. Chan-Vese Cost Functional

In some applications, the object boundaries do not have to be defined by gradients. For example, a piecewise constant minimal variance criterion based on the Mumford-Shah functional was proposed by Chan and Vese to deal with such situations:

$$\epsilon(S, a_1, a_2) = \int_{inside(S)} (I(x,y,z) - a_1)^2 dx\,dy\,dz + \int_{outside(S)} (I(x, y, z) - a_2)^2 dx\,dy\,dz$$

The two constants $a_1$ and $a_2$ are the mean intensities in the interior and exterior of the surface S, respectively. The energy $\epsilon(S, a_1, a_2)$ is minimized when S coincides with the object boundary, and best separates the object and background with respect to their mean intensities.

The variance functional can be approximated using a per-voxel cost model, and in turn be minimized using the net surface model in accordance with the present invention. Since the application of the Chan-Vese cost functional may not be immediately obvious, detection of a terrain-like surface can be used as an example (in other cases, its unfolded image may be considered). WLOG, let a voxel on or below a feasible surface be viewed as being inside the surface; otherwise let it be outside the surface. Then, if a voxel I(x', y', z') is on a feasible surface S, then all voxels I(x', y', z) on Col(x', y') with z≤z' are inside S, while all voxels I(x', y', z) with z>z' are outside S. Hence, the voxel cost c(x', y', z') is assigned as the sum of the inside and outside variances computed in the column Col(x', y'), as follows.

$$c(x', y', z') = \sum_{z \leq z'} (I(x', y', z) - a_1)^2 + \sum_{z > z'} (I(x', y', z) - a_2)^2$$

("Equation 3"). Then, the total cost of 5 will be equal to $\epsilon(S, a_1, a_2)$ (discretized on the grid (x, y, z)). However, the constants $a_1$ and $a_2$ are not easily obtained, since the surface is not well-defined before the global optimization is performed. Fortunately, the model guarantees that if I(x', y', z') is on S, then the voxels I(x, y, $z_1$) with $z_i \equiv \{z | z \leq \max(0, z' - |x - x'|\Delta_x - |y - y'|\Delta_y)\}$ are inside the surface S. Accordingly, the voxels I(x, y, $z_2$) with $z_2 \equiv \{z | z' + |x - x'|\Delta_x + |y - y'|\Delta_y \leq z \leq Z\}$ must be outside S.

Consequently, $\hat{a}_1(x', y', z') = \text{mean}(I(x, y, z_1))$ and $\hat{a}_2(x', y', z') = \text{mean}(I(x, y, z_2))$ can be computed, which are approximations of the constants $a_1$ and $a_2$ for each voxel I(x', y', z'). The estimates are then used in Equation 3 instead of $a_1$ and $a_2$.

5. Implementation of the Methods

The optimal surface determination in a volumetric image can be divided in three major steps: (1) construct the transformed weighted directed graph Cst; (2) compute the minimum s-t cut in Cst; (3) recover the optimal surface from the source set of the computed minimum s-t cut. The minimum s-t cut problem and its dual, the maximum flow problem, are classic combinatorial problems that can be solved by low-order polynomial time algorithms. The most commonly used algorithms can be classified into two categories: the augmenting path family and the push-relabel family.

Though the push-relabel algorithm is commonly considered to be the most efficient for many applied problems, it was shown by Boykov and Kolmogorov that their improved algorithm based on the augmenting path method is more efficient in a class of graphs frequently encountered in computer vision. In the context of surface detection research, execution times of the Boykov-Kolmogorov algorithm, the Edmonds-Karp augmenting path algorithm, and the push-relabel algorithm are compared in the performed experiments. This comparison will be similar to the timing tests performed for the feasibility assessment. The fastest performing algorithm will be chosen, with a possibility of identifying different algorithms of preference for the individual variants of the optimal surface detection approach (single/multiple surfaces; shape priors, topology changes). Choosing an appropriate graph representation is also an important factor with respect to memory efficiency. Therefore, the implicit-arc representation can be used to address this. This representation utilizes the high regularity of the graph edges, since essentially all edges in the constructed graph are known implicitly from the smoothness and surface-separation parameters. Edges from and to the start and terminal vertices are considered auxiliary edges and therefore can be covered easily by the chosen graph representation. An implementation of the single surface segmentation using the implicit-arc representation in accordance with the present invention has shown a significant improvement over that using other graph representations. Thus, the implicit-arc representation can be used for the final implementation of multiple surface detection algorithms to improve both the running-time and memory efficiency.

In real-world surface detection tasks, large size image data sets may require very high computational costs. In order to achieve high performance on those datasets, the integration of the multi-scale approach into the net surface network model could be used, which enables the surface search to be confined to smaller image data sets thus improving the computational speed.

6. Validation/Performance Assessment

The utility of the systems and methods of the present invention are applicable in volumetric medical image data sets from CT, MR, and ultrasound. Image data as well as the expert-determined segmentations are available and their development does not require additional resources.

7. Data

The application of embodiments of the present invention demonstrates that the H developed method is highly general and applicable to virtually any imaging modality as well as to real-world medical image analysis problems. For example:

3-D and 4-D intravascular ultrasound (IVUS) images acquired during routine clinical coronary interventions—to identify lumen and external lamina surfaces in 3-D IVUS sequences, as well as to solve a 4-D problem of simultaneously segmenting these surfaces throughout the cardiac cycle (two interacting surfaces+time).

3-D prostate CT image data routinely acquired for radiation-therapy purposes—to delineate the prostate boundary as a pre-processing step for prostate-cancer treatment (single closed surface).

3-D cartilage MR image data of the human ankle—to identify bone and cartilage surfaces (multiple objects with closed surfaces and shape knowledge). 3-D segmentation of arterial layers in MR images of excised diseased human arteries—the goal is to determine the luminal surface, internal and external elastic lamina surfaces in excised human carotid, iliac, and femoral arteries, in 3-D and across bifurcations (multiple-surface problem, k=4).

3-D and 4-D cardiac MR images from normals and heart disease patients—the goal is to identify endo- and epi-cardial surfaces of the left and right ventricles in normal and diseased cardiac MR scans, both in 3-D and 4-D, i.e., simultaneously throughout the entire cardiac cycle (multiple surfaces+time).

Volumetric 3-D and 4-D pulmonary CT images from normal and diseased human subjects—in order to segment inner and outer wall surfaces of intrathoracic airway trees (multiple surfaces+time).

II. Graph Search Applications with Multiple Inter-Relationships

The present invention includes surface segmentation using a layered graph-theoretic approach that optimally segments multiple interacting surfaces of a single object. As discussed herein, the present invention includes a method of segmenting multiple interacting closed surfaces on a single object. As another methodology discussed below, the present invention provides simultaneous segmentation of multiple closed surfaces associated with multiple mutually interacting objects. The present invention is discussed in the following with reference to the simultaneous segmentation of six bone and cartilage surfaces of the knee joint, but the present invention is applicable to any body part.

In certain embodiments, such as embodiments that permit simultaneous segmentation of multiple closed surfaces associated with multiple mutually interacting objects, any number of two or more objects may interact. The number of objects that are interacting —for example, bones in a joint —may be represented by the variable "q". Accordingly, when two objects are interacting (i.e., "q"=2), such an interaction is termed a "binary object interaction". When three objects are interacting (i.e., "q"=3), such an interaction is termed a "ternary object interaction". When four objects are interacting (i.e., "q"=4), such an interaction is termed a "quaternary object interaction". Since any number of two or more objects, "q", may interact (i.e., "q" may equal any positive integer 2 or higher), the object interaction is defined as a "q-ary object interaction".

Generally, the multi-object multi-surface segmentation method starts with a pre-segmentation step, after which the segmentation of all desired cartilage and bone surfaces are performed simultaneously in a single optimization process. More specifically, in the case of knee-joint segmentation, the femur, tibia, and patella bones and their overlying articular cartilage surfaces are simultaneously segmented.

A. Bone Surface Presegmentation

The femur, tibia and patella bones are approximately presegmented first. It is contemplated that any approach can be used as known to those skilled in the art. For robust presegmentation using a fully automated approach, an iterative graph search method may be employed that utilizes shape models of the individual bones. To form the shape models, a training set of n-dimensional image data, such as 3D MR datasets or 4D image datasets, depicting the knee are segmented using interactive level-set segmentation, with manual editing as necessary. The resulting objects are used to compute mean shapes of the bones using automated surface landmarking and Procrustes analysis. The mean-shape bone surfaces are triangulated and represented, as meshes consisting of a sufficient number of mesh vertices, for example, more than 2000 vertices per object.

When segmenting never-before seen MR datasets, the shape models are approximately fitted to the 3D images and used for initialization of the bone presegmentations. Each of the three bone models (femur, tibia and patella) are fitted independently to accommodate variable joint positions and angles. Using these fitted models, a separate volumetric graph is formed for each of the three bones. An optimal layered graph search algorithm is applied to each of these graphs iteratively, yielding presegmentations of the three bones.

B. Simultaneous Segmentation of Cartilage

The simultaneous segmentation determines the bone and cartilage surfaces of each of the three bones forming the knee joint—six surfaces total. Since the cartilage generally covers only those parts of the respective bones which may come into direct contact with another bone during joint articulation, double surfaces (cartilage & bone) are defined at appropriate locations while single surfaces are detected in non-cartilage regions. This also reflects the distinction between truly external surfaces, and the virtual subchondral bone surface which demarcates bone and cartilage where they are joined.

To facilitate a topologically robust problem definition across a variety of joint shapes and cartilage disease stages, two surfaces are detected for each bone, and the single-double surface topology differentiation reduces into differentiation of zero and non-zero distances between the two surfaces. To identify bone regions in which cartilage may or may not exist, a priori knowledge of knee joint anatomy is used. In this respect, the non-cartilage regions along the external bone surface are identified as regions in which zero distance between the two surfaces is enforced such that the two surfaces collapse onto each other, effectively forming a single bone surface. In the cartilage regions, the zero-distance rule is not enforced, providing for both a subchondral bone and articular cartilage surface segmentation.

The non-cartilage and cartilage regions are defined based on cartilage distributions in a training set of knee-joint datasets—the same data used for deriving the shape model. For each of the three bones of the knee joint, these non-cartilage and cartilage regions are associated with vertices of the mean shape meshes. The mesh vertices are labeled as definitely belonging to a non-cartilage region if the vertex in question has never been associated with a cartilage region in the training set.

Similarly, the vertices are labeled as belonging to a cartilage region if the vertex in question has always been associated with a cartilage region in the training set. Over regions that are associated with cartilage in some samples, and non-cartilage in others, vertices are labeled as transitional. The transitional regions are defined at the boundary between bone and cartilage regions to allow smooth transitions from cartilage (expected non-zero distance between the two surfaces) to non-cartilage (constrained to a zero distance between the two surfaces). The regions thus defined in the training set data are shown in FIG. 15. FIG. 15 shows cartilage/non-cartilage region definitions for the femur (FIG. 15A), tibia (FIG. 15B), and patella (FIG. 15C) according to the present invention. As shown in FIG. 15, the bone-specific cartilage, non-cartilage, and transitional regions are derived from an independent training set and are shown in red, green and blue, respectively.

In addition to dual-surface segmentation that is performed for each individual bone, the bones of the joint interact in the sense that cartilage surfaces from adjacent bones cannot intersect each other. Cartilage and bone surfaces must coincide at the articular margin such that the maximum anatomically feasible cartilage thickness is observed. The regions in which adjacent cartilage surfaces come into contact are called interacting regions. In the knee, such interacting regions exist between the tibia and the femur (tibiofemoral joint) and between the patella and the femur (patellofemoral joint). It is indeed desirable to find these interacting regions automatically, for example, by forming one or more regions of a q-ary object interaction to form a specified q-ary inter-object relationship. In certain embodiments, utilizing the bone preseg- mentations in 3D, the distance transform is computed, and a distance threshold is employed to find median sheets between each pair of adjacent bones in the interacting regions. By mapping the median sheets back to the bone meshes, the interacting areas are defined.

With single/multiple surface, as well as cartilage/non-cartilage region definitions, a multi-object multi-surface graph can be built that is well suited for knee-joint bone and cartilage segmentation. The resulting graph must be a proper-ordered multi-column graph, so that the segmentation task is represented as a search for a V-weight net surface.

1. Graph Construction and Optimization

A graph $G=(V,E)$ is a collection of vertices V and arcs E. If an arc $e_1 \epsilon E$ connects a vertex $v_1 \epsilon V$ with $v_2 \epsilon V$, $v_1$ and $v_2$ are called adjacent and the arc can be written as $<v_1, v_2>$. In a graph with undirected arcs, $<v_1, v_2>$ and $<v_2, v_1>$ are equivalent. In a graph with directed arcs, $<v_1, v_2>$ and $<v_2, v_1>$ are different.

In a multi-column graph, an undirected graph $B=(V_B, E_B)$ in (d−1)−D is called the base graph and represents the graph search support domain. An undirected graph $G=(V,E)$ in d−D is generated by B and a positive integer K, where each vertex $v_i \epsilon V_B$ has a set $V_i$ of K vertices in V. $V_i$ is also called the i-column of G. An i-column and a j-column are adjacent if $v_i$ and $v_j$ are adjacent in B. The construction of a directed graph $\tilde{G}=(\tilde{V}, \tilde{E})$ from G was reported where lemmas are presented showing that a V-weight net $\mathcal{N}$ in G corresponds to a non-empty closed set $\mathcal{S}$ in $\tilde{G}$ with the same weight. Consequently, an optimal surface segmentation problem can be converted to solving a minimum closed set problem in $\tilde{G}$. Especially, when G is proper-ordered, the optimal V-weight net in G can be computed in $T(n, m_B K)$, where n is the number of vertices in V and $m_B$ is the number of arcs in E.

2. Multi-Object Multi-Surface Graph Construction

One step in constructing a multi-object multi-surface graph may include representing n-dimensional image data as an m-dimensional structure to form an image representation. In certain embodiments, while maintaining the same graph structure for the individual objects (femur, tibia and patella in the knee joint), the base graph $G_B = V_B, E_B)$ is formed using the presegmented surface mesh $\mathcal{M}$., where $V_B$ is the vertex set on $\mathcal{M}$ and $E_B$ is the edge set. In the multiple surface detection case, this base graph is duplicated each time when searching for an additional surface. The duplicated base graphs are connected by undirected arcs to form a new base graph which ensures that the interacting surfaces can be detected simultaneously. Additional directed intra-column arcs, inter-column arcs and inter-surface arcs incorporate surface smoothness and surface separation constraints into the graph.

Pursuing multi-object graph construction, the base graphs of the three bones forming the knee joint are connected to form a new base graph. Interacting surface separation constraints are implemented by adding inter-object arcs at the interacting areas. Inter-object surface separation constraints are also added to the interacting areas to define the separation requirements that shall be in place between two adjacent objects. The inter-object arcs are constructed in the same way as the inter-surface arcs. To overcome the problem that no one-to-one correspondence exists between the meshes of the interacting object pairs, corresponding columns i and j are defined between the interacting objects. The corresponding columns have the same directions. Considering offset d between the vertex sets $V_i$ and $V_j$ of the two objects, inter-object arcs A° between two corresponding columns can be defined as:

$$A° = \{\langle V_i(k), V_j(k-d+\delta^l)\rangle \,|\forall k: \max(d-\delta^l,0) \leq k \leq \min(K-1+d-\delta^l, K-1)\} \cup \{\langle V_j(k), V_i(k+d-\delta^u)\rangle \,|\forall k: \max(\delta^u-d,0) \leq k \leq \min(K-1+d-\delta^u, K-1)\}$$

where k is the vertex index number and $\delta^l$ and $\delta^u$ are inter-object separation constraints with $\delta^l \leq \delta^u$.

It may be difficult to find corresponding columns between two regions of different topology. Although the approach presented here offers one possible solution, there is an infinite number of points on the median sheet identified between the pair of interacting objects. A finite number of median sheet points are obtained by sheet meshing. Then, for each sheet mesh vertex point, using the shortest distance criterion, the two nearest vertices of the meshes of the two interacting object presegmentation surfaces are linked, and this correspondence defines the column connecting the two objects for each such pair of points. Consequently, the multiple surfaces are simultaneously segmented for the multiple objects by searching the resulting single graph, the optimization being performed in a single optimization process as described in more detail below.

Figure 16B:
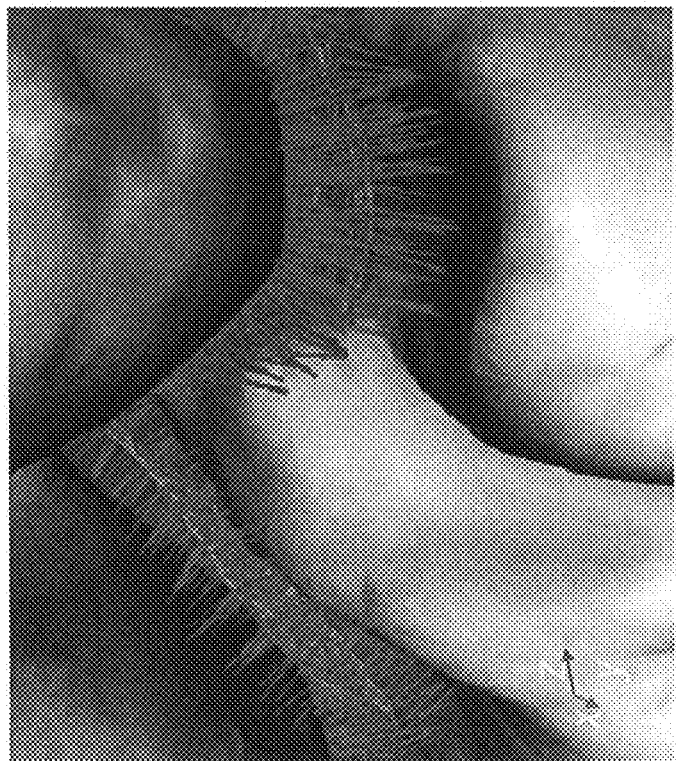
FIG. 16 shows multi-object correspondences demonstrated on tibia-femur surfaces according to the present invention.
Figure 16A:
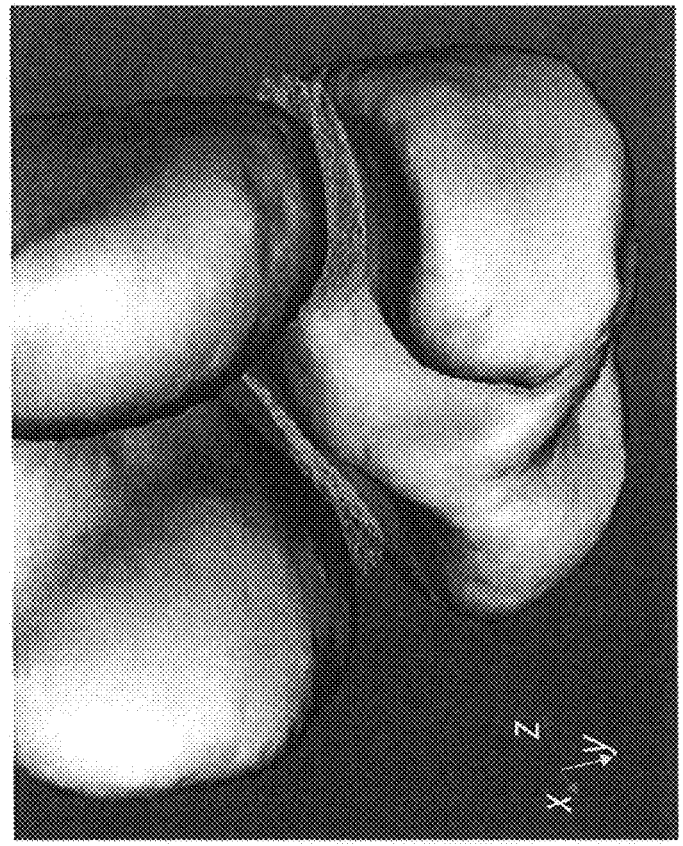

FIG. 16 shows an example of connecting column construction between the femur and the tibia according to the present invention. A medial sheet illustrated in yellow in FIG. 16A is formed in locations of inter-object proximity. The surfaces resulting from bone presegmentation are utilized for medial sheet calculation within a pre-selected bone-to-bone distance range. Corresponding points are defined for each medial sheet mesh vertex point as the closes point on each of the two interacting surfaces. Corresponding surface points, the associated medial sheet point, and their connecting lines form columns for graph construction as shown in FIG. 16B as blue rod pairs.

Figure 17A:
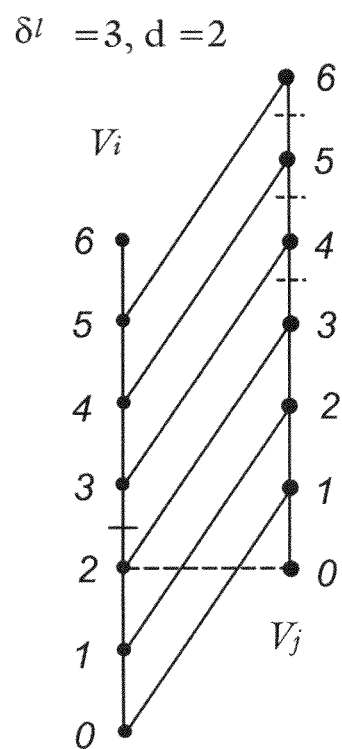
FIG. 17 shows inter-object arcs usage in segmentation of interacting objects according to the present invention.
Figure 17B:
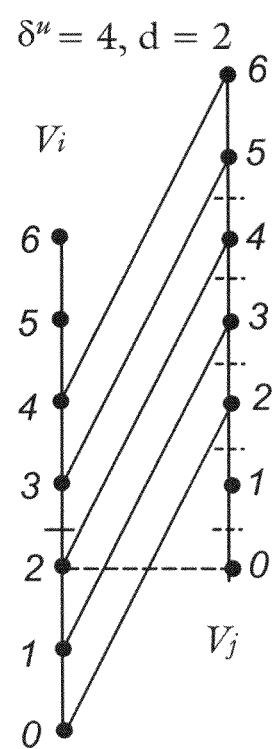

In certain embodiments, a specified q-ary inter-object relationship may be illustrated by an inter-object arc. A simple inter-object arc example is shown in FIG. 17, in which one and only one graph cut exists for both $V_i$ and V. The cut represents the surface locations and all the vertices below the cut form a closed set. For example, suppose the graph cut is between vertices 2 and 3 for $V_i$ in FIG. 17A. Then, the graph cut for $V_j$ must be above vertex 3 for $V_j$, so that the minimum separation is $\delta^l$. Likewise, if the graph cut for $V_i$ is between vertices 2 and 3 as shown in FIG. 17B, then the graph cut for $V_j$ must be below vertex 5, so that the maximum separation is $\delta^u$.

3. Cost Function and Graph Optimization

Another step in certain method embodiments of the present invention may include calculating a cost functional related to an m-dimensional structure and the one or more regions of the q-ary object interaction. In certain embodiments, the resulting segmentation is driven by the cost functions associated with the graph vertices. For solving the knee bone/cartilage segmentation task, the on-surface cost functions assign a combination of image gradient and image intensity information to the graph vertices, in which the in-region cost functions consider the intensity distributions.

Let I be an image smoothed by a curvature-driven anisotropic diffusion filter. The edge information is obtained from I by computing the magnitude of the 3D image gradient $|\nabla I|$. The corresponding edge cost is defined as $$C_g = e^{-\frac{|\nabla I|}{2}}.$$

Since the cartilage intensity is usually higher than that of the surrounding tissues, the desired intensity properties are preferred by subtracting a positive value from the cost. Likewise, undesired intensity changes are penalized by adding positive values to the graph vertices. The on-surface cost function C for cartilage areas, with the positive value in question $C_i$, can be defined as:

$$\begin{cases} \text{Searching toward cartilage,} & i_{k-1} < i_k < i_{k+1}: \\ C(k) = C_g(k) - C_i; \\ \text{Searching toward cartilage,} & i_{k-1} > i_k > i_{k+1}: \\ C(k) = C_g(k) + C_i; \\ \text{Searching away from cartilage,} & i_{k-1} < i_k < i_{k+1}: \\ C(k) = C_g(k) + C_i; \\ \text{Searching away from cartilage,} & i_{k-1} > i_k > i_{k+1}: \\ C(k) = C_g(k) - C_i. \end{cases}$$

Using only on-surface cost functions lacks regional information. When the boundary is weak, the segmentation may be locally inaccurate. Assuming that the image intensity is Gaussian distributed, the difference of dissimilarity probabilities is assigned as the cost to the graph nodes.

Utilizing the substantial MR intensity differences between cartilage and bone regions on MR images, each of these 2 regions is represented by a fixed mean and standard deviation. These gray-level differences served well for identifying the bone-cartilage interface (BCI) in MRI. However, the interface between cartilage and other tissues within the joint space (cartilage-tissue interface or CTI) is less easy to identify, since the cartilage intensity is not uniformly distributed and there is a large overlap between the intensity distribution of the cartilage and the surrounding tissues. Additionally, the absolute values of image intensity vary from scan to scan. Therefore, the cartilage and joint space tissue MR intensity means and standard deviations are adaptively estimated as follows. Points inside of the presegmented bone surface are used to estimate the parameters of the bone marrow. Points immediately outside of this surface are used to estimate cartilage region properties. The properties of other soft tissues in the joint vicinity are modeled using a combination of two Gaussians, the parameters of which are derived from the estimated cartilage region properties to exclude high intensity fluid and low intensity tissues from the resulting cartilage region.

An additional step in certain method embodiments of the present invention may include segmenting n-dimensional image data with one or more layer surfaces of multiple objects using the cost functional, the image representation, and the specified q-ary inter-object relationship to produce segmented layers. In certain embodiments, the segmentation is through graph optimization. For example, after the step of cost translation, the constructed interacting graph is a directed graph $\tilde{G}$ derived from a properly-ordered multi-column graph G. As stated before, a V-weight net surface problem in G can be converted to finding the minimum non-empty closed set in $\tilde{G}$. This can be done by a minimum-cost s-t cut algorithm.

C. Experimental Methods

The present invention was employed to segment the bone and cartilage surfaces in MR images of knee joints. Surface segmentation accuracy for the task of simultaneously segmenting 6 surfaces (femoral bone, femoral cartilage, tibial bone, tibial cartilage, patellar bone, patellar cartilage) in full 3D is determined. The performance of the algorithm is assessed in sixteen datasets selected from the publicly available Osteoarthritis Initiative (OAI) database. The datasets included images from seven subjects in the incidence cohort and nine subjects in the progression cohort. These two cohorts differ in terms of their severity of joint degeneration, so that the samples cover a range of disease severity. The image data originated from 3T MR scanning with the following imaging parameters: image size 384×384×160 voxels, voxel size 0.3645×0.3645×0.70 mm$^3$. Images are acquired using a sagittal 3D dual-echo steady state (DESS) sequence with water-excitation. The cost functions and other segmentation parameters, as well as the shape model used for initialization and the cartilage/non-cartilage region definition, are derived from a completely disjoint training set of nine MR images from the same OAI database.

The only User-interactive step is to approximately position the mean bone shapes in the 3D MR images. Since the OAI data have a consistent orientation of image acquisition, the operator only needs to define a bounding box of interest roughly encompassing the femur, tibia and patella bones. Following this interactive step, the mean shape models are automatically oriented and scaled. The user interaction process is simple and typically requires 10 to 30 seconds per dataset. Following this initialization, the remaining processes of iterative graphsearch presegmentation and the subsequent multi-object multi-surface segmentation are fully automated. No surfaces determined by the computer method are edited prior to the final performance assessment.

While the method as described above utilizes in-region costs to segment the bone, cartilage, and outer tissues, the first five iterations of the iterative graph search yielding bone presegmentation uses on-surface cost. The initial surface smoothness is set as $\Delta=6$ vertices (due to anisotropic voxel sizes, $\Delta$ ranged from 1.09 to 2.1 mm based on the direction in the 3D volume, similar directionality-caused ranges apply to other parameters). After each iteration, the surface smoothness are decreased by one. Following the bone presegmentation, the surfaces are upsampled by a factor of two, and in-region cartilage costs are employed, using a fixed smoothness of $\Delta=2$ (0.36-0.70 mm) for the remaining three iterations.

For graph construction, vertices are sampled in a narrow band of [−15, 15] voxels (−10.5-10.5 mm) along the normal direction around the presegmented surface (upsampled to K=91). The surface smoothness parameters are set to $\Delta=2$ vertices (0.24 to 0.47 mm) and $\Delta=4$ vertices (0.48-0.94 mm) for the bone and cartilage surfaces, respectively. The inter-surface distance constraint values are set to $\delta_{lower}=0$ and $\delta_{upper}=30$ vertices (0-7.0 mm). Using a distance threshold I=9 voxels (3.3-6.3 mm) for the medial sheet construction, the inter-object surface smoothness parameters are $\delta^l=0$ and $\delta^u=60$ (0-14.0 mm). Finally, the intensity modifier value is $C_i=30$. The cost functions designed for final segmentation are computed as a combination of in-region cost (applied to cartilage regions) and on-surface cost (applied to non-cartilage and transitional regions). All these parameters are determined empirically on the training set.

To perform quantitative validation of the segmentation performance, 10 MR slices are randomly selected for each dataset, and the bone and cartilage surfaces for the femur and the tibia are traced by four expert observers. Single-expert tracings are obtained for the patella surfaces. Overall, 160 MR slices from 16 3D datasets are traced by each of the four expert observers. The selection of expert-traced slices is random, but guaranteed to cover the entire joint region for all datasets. The independent standard is formed using a cubic spline fit of the tracing points from all expert tracers according to the least square error criterion.

The knee bone and cartilage segmentation method is validated by determining surface positioning errors of the automated segmentation with respect to the independent standard (manual tracing). Surface positioning errors are defined as the shortest distances between the independent standard and computer-determined surfaces. Signed and unsigned surface positioning errors are expressed as mean±standard deviation in voxels and millimeters. Similarly, local cartilage thickness is measured as the closest distance between the cartilage and bone surfaces and compared to the independent standard. Signed and unsigned cartilage thickness errors are expressed as mean±standard deviation in voxels and millimeters.

Sensitivity of the final segmentation to the initialization of presegmentation is evaluated to determine reproducibility. The initial position of the presegmentation template is perturbed by three voxels (1.09-2.10 mm) in each of in-plane and 3D-diagonal directions resulting in twenty-six repeated segmentations for each dataset. The distances between the segmentation surfaces of the twenty-six perturbed segmentations and the central non-perturbed segmentation surface are quantified for each testing dataset and served as a reproducibility measure for the surface segmentation and cartilage thickness determination.

D. Results

The sixteen testing datasets are segmented according to the present invention. After the initialization step of roughly matching the mean shapes to the corresponding bones, the rest of the process is fully automated and no resulting surfaces are manually edited. The segmentation requires roughly three minutes on average to segment one knee-joint dataset, on a PC with Intel Core 2 Duo 2.6 GHz processor and 4 GB of RAM (single thread).

Figure 18B:
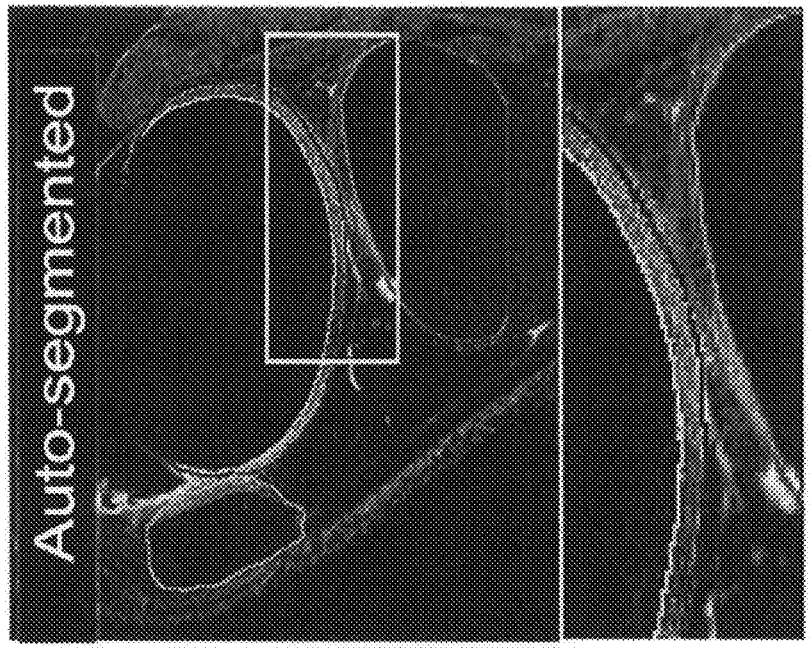
FIG. 18 shows magnetic resonance (MR) image segmentation of a knee joint according to the present invention.
Figure 18A:
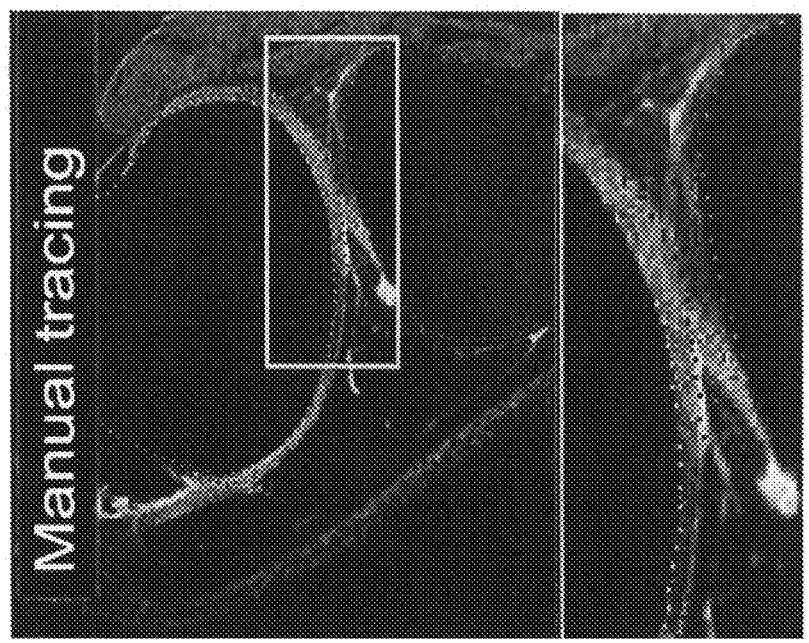

FIG. 18 shows magnetic resonance (MR) image segmentation of a knee joint, specifically an example of a knee-joint contact area slice from the 3D MR dataset according to the present invention. The contact between the femoral and tibial cartilage surfaces, as well as the contact between the femoral and patellar cartilage surfaces is noted. Furthermore, there is an area of high intensity synovial fluid adjacent to the femoral cartilage that is not part of the cartilage tissue and is not segmented. FIG. 18A shows the original image data with expert tracing overlayed. FIG. 18B shows the resulting computer segmentation that demonstrates very good delineation of all six segmented surfaces and correct exclusion of the synovial fluid from the cartilage surface segmentations.

Figures 19A, 19B:
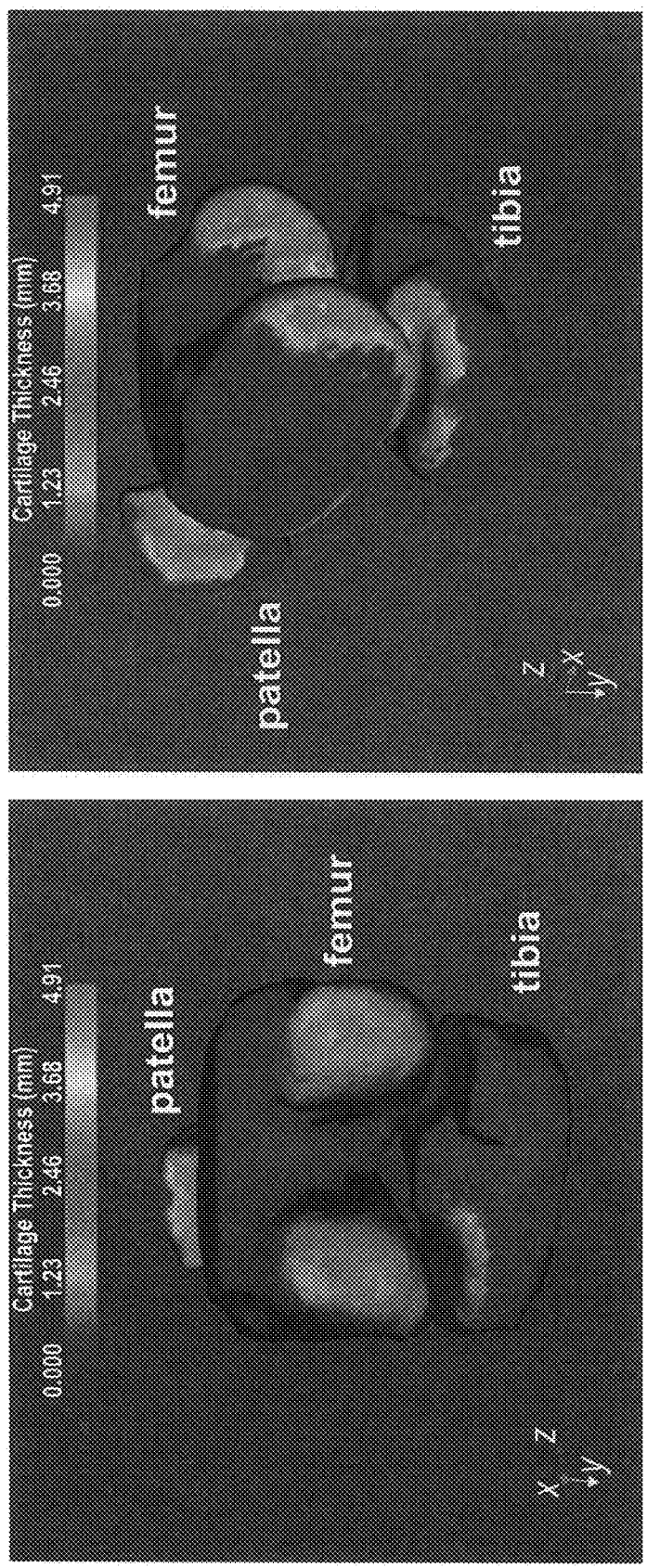
FIG. 19 shows three-dimensional (3D) segmentation of knee bone and cartilage surfaces performed simultaneously according to the present invention.

Since the segmentations are performed simultaneously for all six bone/cartilage surfaces in the 3D space, computer segmentation directly yields the 3D cartilage thickness for all bone surface locations. FIG. 19 shows 3D renderings of the knee-joint segmentation with color-coded cartilage thickness. FIG. 19A illustrates a posterior view and FIG. 19B illustrates a postero-lateral view.

The signed and unsigned surface positioning errors in millimeters of the obtained cartilage segmentations are quantitatively measured over the cartilage regions, and are presented in Table 1:

TABLE 1

|  | Signed bone error | Signed cartilage error | Unsigned bone error | Unsigned cartilage error |
| --- | --- | --- | --- | --- |
| Femur | 0.05 ± 0.41 | 0.05 ± 0.80 | 0.29 ± 0.30 | 0.55 ± 0.60 |
| Tibia | 0.14 ± 0.35 | −0.05 ± 0.80 | 0.27 ± 0.27 | 0.62 ± 0.55 |
| Patella | 0.05 ± 0.66 | 0.05 ± 1.38 | 0.44 ± 0.51 | 1.03 ± 0.99 |

The average signed surface positioning errors for the six detected surfaces ranged from 0.05 to 0.14 mm while the average unsigned surface positioning error ranged from 0.27 to 1.03 mm. The signed and unsigned cartilage thickness errors in millimeters are given in Table 2:

TABLE 2

|  | Signed | Unsigned |
|---|---|---|
| Femur Cartilage | 0.00 ± 0.80 | 0.58 ± 0.57 |
| Tibia Cartilage | −0.19 ± 0.80 | 0.64 ± 0.56 |
| Patella Cartilage | 0.06 ± 1.35 | 1.05 ± 0.92 |

The average signed cartilage thickness errors ranged from −0.19 to 0.06 mm. The average unsigned cartilage thickness errors ranged from 0.58 to 1.05 mm. The surface positioning and cartilage thickness errors demonstrate a good overall accuracy with a minimal bias as determined by the signed errors with determined surfaces locally fluctuating around the unbiased mean. Among the three bones, the patellar cartilage segmentation is associated with the greatest (absolute) errors. This is not unexpected given that the patellar cartilage is the thickest.

The reproducibility assessment in voxel units of the present invention is reported in Table 3:

TABLE 3

|  | Signed bone surface | Signed cartilage surface | Unsigned bone surface | Unsigned cartilage surface | Signed cartilage thickness | Unsigned cartilage thickness |
|---|---|---|---|---|---|---|
| Femur | 0.13 ± 0.44 | −0.02 ± 0.86 | 0.35 ± 0.29 | 0.63 ± 0.62 | 0.00 ± 0.75 | 0.54 ± 0.52 |
| Tibia | 0.22 ± 0.41 | 0.37 ± 1.10 | 0.34 ± 0.32 | 0.91 ± 0.81 | 0.03 ± 0.86 | 0.62 ± 0.63 |
| Patella | 0.11 ± 0.40 | 0.01 ± 0.97 | 0.31 ± 0.29 | 0.76 ± 0.68 | −0.01 ± 0.87 | 0.67 ± 0.59 |

The mean border positioning differences resulting from the perturbed initializations ranged from −0.02 to 0.37 mm. The signed cartilage thickness differences show excellent reproducibility ranging from −0.01 to 0.03 mm on average.

The present invention is based on a layered graph optimal image segmentation that was extended to handle multiple interacting objects. The present invention facilitates utilization of the optimal layered graph approach for segmentation of multiple objects for which the interaction properties may be based on surface proximity as well as on any other general mutual relationships, for example, relative distances of object centroids, orientation of the interacting objects in space, relative orientation of the interacting surfaces, to name a few. The present invention can be directly extended to n-D and the inter-object relationships can include higher-dimensional interactions such as mutual object motion or interactive shape changes over time.

The presented invention yields globally optimal segmentation of multiple surfaces and multiple objects, that are obtained simultaneously for all objects and all surfaces involved in the segmentation task. The present invention allows respective constraints and a priori information to be incorporated in the searched graph. The final segmentation is achieved in a single optimization step.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A method for image segmentation comprising the steps of: representing n-dimensional image data as an m-dimensional structure to form an image representation using a graph-search approach, wherein said n-dimensional image data represents an image that depicts multiple objects and each of the multiple objects has one or more surfaces; forming one or more regions of a q-ary object interaction to form a specified q-ary inter-object relationship; calculating a cost functional related to the m-dimensional structure and the one or more regions of the q-ary object interaction; and segmenting the n-dimensional image data with one or more layer surfaces of multiple objects using the cost functional, the image representation, and the specified q-ary inter-object relationship to produce segmented layers, thereby simultaneously segmenting the image that depicts multiple objects.

2. The method of claim 1 further comprising the step of utilizing quantitative analysis of one or more segmented layers.

3. The method of claim 1, wherein the n-dimensional image data represents a medical image.

4. The method of claim 1, wherein the n-dimensional image data represents an orthopedic image.

5. The method of claim 1, wherein the n-dimensional image data represents a volumetric image.

6. The method of claim 1, wherein the cost functional includes cost terms that are obtained from a combination of one or more of the following feature term categories selected from the group comprising of image properties, global smoothness constraints of one or more boundary surfaces of the m-dimensional structure, local smoothness constraints of one or more boundary surfaces of the m-dimensional structure, object-independent smoothness constraints of one or more boundary surfaces of the m-dimensional structure, object-specific smoothness constraints of one or more boundary surfaces of the m-dimensional structure, q-ary object interactions, optimally selected features selection, training examples, regions of object interaction, expert-designed features, imaging modalities, and patient characteristics.

7. The method of claim 1, wherein said calculating step is performed in an optimal fashion.

8. The method of claim 1 further comprising the step of employing one or more graph image representations to describe the m-dimensional structure and q-ary object interaction.

9. The method of claim 8, wherein the one or more graph image representations enforces boundary surface smoothness constraints.

10. The method of claim 1 further comprising the step of identifying individual layer-separating surfaces.

11. The method of claim 1 further comprising the step of establishing correspondence between the surfaces of interacting objects to form individual object graph representations to enforce the q-ary object interactions.

12. The method of claim 11, wherein said corresponding step further comprises the step of calculating an approximating separating surface.

13. The method of claim 12, wherein the approximating separating surface is a medial sheet.

14. The method of claim 11, wherein said establishing step further comprises the step of modifying topology of one or more individual-object graph representations.

15. The method of claim 1, wherein the graph-search approach is an optimal multi-layer graph-search approach.

16. The method of claim 2, wherein said utilizing step includes one or more of the following characteristics selected from the group comprising of morphologic characteristics, textural characteristics, and functional characteristics.

17. The method of claim 16, wherein the characteristics represent properties of the one or more segmented layers.

18. The method of claim 16, wherein the characteristics represent properties of any portion or portions of the one or more segmented layers.

19. The method of claim 2, wherein the quantitative analysis includes one or more characteristics selected from the group comprising of morphologic characteristics, textural characteristics, and functional characteristics.

20. The method of claim 19, wherein the characteristics represent global or local properties of one or more selected from the group comprising of an individual object, an object part, or an object combination.

21. The method of claim 2, wherein said utilizing step further comprises the step of exporting the quantitative analysis as a report.

22. The method of claim 2, wherein said utilizing step further comprises the step of storing the quantitative analysis on a storage medium.

23. The method of claim 22, wherein the storage medium is one selected from the group comprising of paper and computer disk.

24. The method of claim 2, wherein said utilizing step is visualized in a form corresponding to the representation of the segmented layers of said segmenting step.

25. The method of claim 1, wherein the wherein the n-dimensional image data represents a pelvis image.

* * * * *

UNITED STATES PATENT AND TRADEMARK OFFICE
CERTIFICATE OF CORRECTION

PATENT NO. : 8,571,278 B2 Page 1 of 1
APPLICATION NO. : 12/291803
DATED : October 29, 2013
INVENTOR(S) : Milan Sonka et al.

It is certified that error appears in the above-identified patent and that said Letters Patent is hereby corrected as shown below:

In the Specifications

Col. 1, line 14

Under the heading "STATEMENT CONCERNING FEDERALLY SPONSORED RESEARCH", delete the following:

"The development of this invention was in part supported by government contracts from the National Institutes of Health grants R01-EB004640 and R44-AR052983. The government has certain rights in the invention."

Under the heading "STATEMENT CONCERNING FEDERALLY SPONSORED RESEARCH", add the following:

This invention was made with government support under R01-EB004640 and R44-AR052983 awarded by National Institutes of Health. The government has certain rights in the invention.

Signed and Sealed this
Twenty-eighth Day of January, 2014

Michelle K. Lee
*Deputy Director of the United States Patent and Trademark Office*